(12) United States Patent
Araki et al.

(10) Patent No.: US 11,381,390 B2
(45) Date of Patent: *Jul. 5, 2022

(54) SECURE COMPUTATION APPARATUS, SYSTEM, METHOD AND PROGRAM

(71) Applicant: NEC Corporation, Tokyo (JP)

(72) Inventors: Toshinori Araki, Tokyo (JP); Kazuma Ohara, Tokyo (JP); Jun Furukawa, Herzliya (IL)

(73) Assignee: NEC CORPORATION, Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 16/759,876

(22) PCT Filed: Oct. 31, 2017

(86) PCT No.: PCT/JP2017/039450
§ 371 (c)(1),
(2) Date: Apr. 28, 2020

(87) PCT Pub. No.: WO2019/087317
PCT Pub. Date: May 9, 2019

(65) Prior Publication Data
US 2020/0287711 A1 Sep. 10, 2020

(51) Int. Cl.
*G06F 21/00* (2013.01)
*H04L 9/08* (2006.01)
(Continued)

(52) U.S. Cl.
CPC .............. *H04L 9/085* (2013.01); *G06F 7/501* (2013.01); *G06F 7/723* (2013.01); *H04L 2209/46* (2013.01)

(58) Field of Classification Search
None
See application file for complete search history.

(56) References Cited

U.S. PATENT DOCUMENTS 7,359,507 B2 * 4/2008 Kaliski .................. H04L 9/085
380/28
8,085,938 B2 * 12/2011 Kagaya .................. H04L 9/085
713/168
(Continued)

FOREIGN PATENT DOCUMENTS

JP 2016-173533 A 9/2016
WO 2015/053185 A1 4/2015
(Continued)

OTHER PUBLICATIONS

International Search Report for PCT Application No. PCT/JP2017/039450, dated Jan. 16, 2018.
(Continued)

*Primary Examiner* — Maung T Lwin
(74) *Attorney, Agent, or Firm* — Sughrue Mion, PLLC

(57) ABSTRACT

A bit-decomposition secure computation apparatus uses r1, r2, and r3 satisfying w=r1+r2+r3 mod $2^n$ as share information of (2, 3) threshold type RSS (Replicated Secret Sharing) stored in a share value storage apparatus, and includes an addition sharing part that sums two values out of the share information by modulo $2^n$ arithmetic and distributes the sum using (2, 3) type RSS; and a full adder secure computation part that adds the value generated by the addition sharing part by distributing the sum of the two values to share information of one remaining value other than the two values used by the addition sharing part for each digit by using secure computation of a full adder.

17 Claims, 11 Drawing Sheets

(51) Int. Cl.
*G06F 7/501* (2006.01)
*G06F 7/72* (2006.01)

(56) References Cited

U.S. PATENT DOCUMENTS

| | | |
|---|---|---|
| 11,115,196 B1* | 9/2021 | Triandopoulos ...... H04L 63/083 |
| 2016/0218862 A1 | 7/2016 | Ikarashi et al. |
| 2016/0335924 A1 | 11/2016 | Ikarashi et al. |
| 2018/0062834 A1* | 3/2018 | Zhang ................... H04L 9/085 |
| 2018/0270057 A1 | 9/2018 | Furukawa |

FOREIGN PATENT DOCUMENTS

| | | |
|---|---|---|
| WO | 2015/107952 A1 | 7/2015 |
| WO | 2017/038761 A1 | 3/2017 |

OTHER PUBLICATIONS

Toshinor Araki et al., "High-Throughput Semi-Honest Secure Three-Party Computation with an Honest Majority.", CCS 16: Proceedings of the 2016 ACM SIGSAC Conference on Computer and Communications Security, Oct. 24-28, 2016, pp. 805-817, Vienna, Austria.
Dai Ikarashi et al., "Secure Database Operations Using An Improved 3-party Verifiable Secure Function Evaluation," SCIS 2011, Japan.
Dai Ikarashi et al., "0(I) Bits Communication Bit Decomposition and O(|p'|) Bits Communication Modulus Conversion for Small k Secret-sharing-based Secure Computation", CSS 2013, Japan.
Ryo Kato et al., Improving Efficiency or Secure Multi-Party Computation, Computer Security Symposium 2011, Oct. 12, 2011, pp. 427-431, Japan.

* cited by examiner

SECURE COMPUTATION APPARATUS, SYSTEM, METHOD AND PROGRAM

This application is a National Stage Entry of PCT/JP2017/039450 filed on Oct. 31, 2017, 2010, the contents of all of which are incorporated herein by reference, in their entirety.

FIELD

The present invention relates to a secure computation apparatus, system, method, and program, and particularly to a secure computation apparatus, method, and program suitable for bit decomposition and bit combination.

BACKGROUND

A secure computation scheme is a technology that can allow a computer system to conceal computation process and result against related parties. By performing secret sharing of data by storing shares in a plurality of servers managed by a third party such as a cloud, it is possible to execute any operation on the data. Since data, computation process, and computation result(s) are not known to the third party, secure computation can be used to outsource an analysis process on sensitive information such as personal information.

The following describes secure computation using Replicated Secret Sharing having (2, 3) threshold access structure (referred to as "(2, 3) threshold type RSS"). (2, 3) threshold type RSS (also abbreviated as "(2, 3) type RSS") is one of methods for implementing a (2, 3) secret sharing scheme. In the (2, 3) secret sharing scheme, three items of share information are generated from an input value (secret information), and the original value (secret information) is reconstructed by collecting the number of a threshold value (=2) or more items of share information. The original value can be reconstructed from two or more items of share information, but it cannot be known from one or fewer items of share information.

In (2, 3) threshold type RSS, in secret sharing of a value w from 0 to p−1 or less, a set of three values (r1, r2, and r3), each from 0 to p−1 or less, is generated such that $$w = r1 + r2 + r3 \bmod p \quad (1)$$

and, as three items of share information, three tuples are used wherein each of the three tuples has two values selected from (r1, r2, r3), different from each other, thereby implementing (2, 3) secret sharing. It is noted that p is called modulus.

A method for executing computation on shares distributed by secret sharing without reconstruction of the shares is called secure computation. The following describes a secure computation method for a value shared (distributed) using the (2, 3) RSS scheme.

First, a method for sharing a value will be described, and then addition, subtraction, and multiplication will be described. Here, a procedure will be described in which shares of a value are shared by and stored in three apparatuses and then secure computation is performed on the share values. Below, the three apparatuses are distinguished by calling them apparatus 1, apparatus 2, and apparatus 3.

<Value-Sharing Scheme>

In secret-sharing of a value w not less than 0 and less than p where p is an integer of 2 or more, r1, r2, and r3 that are randomly selected so as to satisfy $$w = r1 + r2 + r3 \bmod p$$

are generated and stored in the apparatuses 1 to 3 as follows.
The apparatus 1 stores (r1, r2) as a share value of w.
The apparatus 2 stores (r2, r3) as a share value of w.
The apparatus 3 stores (r3, r1) as a share value of w.
Each of the apparatuses lacks one of r1, r2, and r3. Therefore, no apparatus can obtain the original value w, but it can be confirmed that the original value w can be reconstructed from share information stored by two or more apparatuses.

<Addition Processing>

The following describes addition processing executed with respect to a value w and a value w' stored in a distributed manner in the apparatus 1, the apparatus 2, and the apparatus 3 using the above-described method.
Here, $$w = r1 + r2 + r3 \bmod p$$

$$w' = r1' + r2' + r3' \bmod p \quad (2)$$

The apparatus 1 stores
(s1, t1) = (r1, r2) as a share value of w, and
(s1', t1') = (r1', r2') as a share value of w'.
The apparatus 2 stores
(s2, t2) = (r2, r3) as a share value of w, and
(s2', t2') = (r2', r3') as a share value of w'.
The apparatus 3 stores
(s3, t3) = (r3, r1) as a share value of w, and
(s3', t3') = (r3', r1') as a share value of w'.
Each apparatus performs processing according to the following procedure.
The apparatus 1 calculates (s1", t1") by calculating $$(s1'', t1'') = (r1'' = s1 + s1' \bmod p, r2'' = t1 + t1' \bmod p) \quad (3)$$

and stores (s1", t1") as a share value of an addition value w+w'.
The apparatus 2 calculates (s2", t2") by calculating $$(s2'', t2'') = (r2'' = s2 + s2' \bmod p, r3'' = t2 + t2' \bmod p) \quad (4)$$

and stores (s2", t2") as a share value of the addition value w+w'.
The apparatus 3 calculates (s3", t3") by calculating $$(s3'', t3'') = (r3'' = s3 + s3' \bmod p, r1'' = t3 + t3' \bmod p) \quad (5)$$

and stores (s3", t3") as a share value of the addition value w+w'.
Each computation result is a share value of w+w' shared using r1", r2", and r3" which satisfy $$w + w' = r1'' + r2'' + r3'' \bmod p \quad (6).$$

This can be confirmed by $$r1'' + r2'' + r3'' = (r1 + r2 + r3) + (r1' + r2' + r3') = w + w' \bmod p \quad (7).$$

<Subtraction Processing>

The following describes subtraction processing executed with respect to sharing of a value w and a value w' stored in a distributed manner in the apparatus 1, the apparatus 2, and the apparatus 3 using the above described method. It is assumed that $$w = r1 + r2 + r3 \bmod p$$

$$w' = r1' + r2' + r3' \bmod p \quad (8).$$

The apparatus 1 stores
(s1, t1) = (r1, r2) as a share value of w, and
(s1', t1') = (r1', r2') as a share value of w'.
The apparatus 2 stores
(s2, t2) = (r2, r3) as a share value of w, and
(s2', t2') = (r2', r3') as a share value of w'.

The apparatus 3 stores
(s3, t3)=(r3, r1) as a share value of w, and
(s3', t3')=(r3', r1') as a share value of w'.
Each apparatus performs processing according to the following procedure.
The apparatus 1 calculates (s1", t1") by calculating $$(s1'', t1'') = (r1'' = s1 - s1' \bmod p, r2'' = t1 - t1' \bmod p) \quad (9)$$

and stores (s1", t1") as a share value of w−w'.
The apparatus 2 calculates (s2", t2") by calculating $$(s2'', t2'') = (r2'' = s2 s2' \bmod p, r3'' = t2 t2' \bmod p) \quad (10)$$

and stores (s2", t2") as a share value of w−w'.
The apparatus 3 calculates (s3", t3") by calculating $$(s3'', t3'') = (r3'' = s3 s3' \bmod p, r1'' = t3 t3' \bmod p) \quad (11)$$

and stores (s3", t3") as a share value of w−w'.
Each computation result is a share value of w−w' shared using r1", r2", and r3" which satisfy $$w - w' = r1'' + r2'' + r3'' \bmod p \quad (12)$$

This can be confirmed by $$r1'' + r2'' + r3'' = (r1 + r2 + r3) - (r1' + r2' + r3') = w - w' \bmod p \quad (13)$$

<Multiplication Processing>
The following describes multiplication processing executed with respect to sharing of a value w and a value w' stored in a distributed manner in the apparatus 1, the apparatus 2, and the apparatus 3 using the above described method.
First, what value each apparatus stores will be indicated.
It is assumed that r1, r2, and r3 are randomly selected values that satisfy $$r1 + r2 + r3 = w \bmod p \quad (14)$$

and r1', r2', r3' are randomly selected values that satisfy $$r1' + r2' + r3' = w' \bmod 2^n \quad (15).$$

The apparatus 1 stores
(s1, t1)=(r1, r2) as a share value of w, and
(s1', t1')=(r1', r2') as a share value of w'.
The apparatus 2 stores
(s2, t2)=(r2, r3) as a share value of w, and
(s2', t2')=(r2', r3') as a share value of w'.
The apparatus 3 stores
(s3, t3)=(r3, r1) as a share value of w, and
(s3', t3')=(r3', r1') as a share value of w'.
Each apparatus performs processing according to the following procedure.
It is assumed that, as randomly selected values that satisfy $$r1'' + r2'' + r3'' = 0 \bmod 2^n, \quad (16)$$

the apparatus 1 stores r1",
the apparatus 2 stores r2", and
the apparatus 3 stores r3". r1", r2", and r3" that satisfy such properties are required as one-time use values, each time multiplication is executed. A method by which the three apparatuses efficiently generate such three values will be described later.
The apparatus 1 calculates $$u2 = s1 \ast s1' + s1 \ast t1' + t1 \ast s1' + r1'' \bmod p \quad (17)$$

and sends u2 to the apparatus 2.
The apparatus 2 calculates $$u3 = s2 \ast s2' + s2 \ast t2' + t2 \ast s2' + r2'' \bmod p \quad (18)$$

and sends u3 to the apparatus 3.
The apparatus 3 calculates $$u1 = s3 \ast s3' + s3 \ast t3' + t3 \ast s3' + r3'' \bmod p \quad (19)$$

and sends u1 to the apparatus 1.
The apparatus 1 stores (u1, u2) as a share value of w*w'.
The apparatus 2 stores (u2, u3) as a share value of w*w'.
The apparatus 3 stores (u3, u1) as a share value of w*w'.
First, the following can be confirmed.

$$\begin{aligned} u1 + u2 + u3 = & \quad (20) \\ r1 \ast r1' + r1 \ast r2' + r2 \ast r1' + r2 \ast r2' + r2 \ast r3' + r3 \ast r2' + \\ & r3 \ast r3' + r3 \ast r1' + r1 \ast r3' + r1'' + r2'' + r3'' = \\ & (r1 + r2 + r3) \ast (r1' + r2' + r3') + r1'' + r2'' + r3'' = w \ast w' \bmod p. \end{aligned}$$

From the values stored in the apparatus 1 and the apparatus 2, w*w' mod p can be calculated using the same computation method.
The same applies to other combinations of the apparatuses. According to such a method, multiplication on w and w' shared by (2, 3) threshold type RSS can be executed without reconstructing each value, and a value obtained by sharing w*w' using (2, 3) threshold type RSS can be shared.
<Generation of Random Numbers>
The following describes a method for generating three values, addition of which become 0 such as $$r1 + r2 + r3 = 0 \bmod 2^n \quad (21)$$

without communication among the apparatus 1, the apparatus 2 and the apparatus 3, in large quantities, in such a manner in which a value that each apparatus possesses is not known to the other apparatuses.
Here, a method for generating r[i, 1], r[i, 2], r[i, 3], which satisfy $$r[i,1] + r[i,2] + r[i,3] = 0 \bmod 2^n$$

for i=1, N, where N is a relatively large number, will be described.
A pseudo random number generator (PRG) outputs an n-bit numeric string with a key and index as input.
The index may be a counter. This method is described in Non-Patent Literature 3 for example.
First, as a setup process of the apparatuses, L1, L2, and L3, which are keys of the PRG, are generated.
It is assumed that
the apparatus 1 stores L1 and L3,
the apparatus 2 stores L2 and L1, and
the apparatus 3 stores L3 and L2.
It is also assumed that the apparatuses 1 to 3 share an index idx synchronized with a counter or the like.
The apparatus 1 supplies the key L1 and the index idx to the PRG, and generates an n-bit numeric value r'[1] as an output of the PRG.
Further, the apparatus 1 also supplies the key L3 and the index idx to the PRG, and generates an n-bit numeric value r'[3] as an output of the PRG.
Then, the apparatus 1 obtains $$r[1] = r'[1] - r'[3] \bmod p \quad (22).$$

The apparatus 2 supplies the key L2 and the index idx to the PRG, and generates an n-bit numeric value r'[2] as an output of the PRG.
Further, the apparatus 2 also supplies the key L1 and the index idx to the PRG, and generates an n-bit numeric value r'[1] as an output of the PRG.

Then, the apparatus 2 obtains $$r[2]=r'[2]-r'[1] \bmod p \qquad (23).$$

The apparatus 3 supplies the key L3 and the index idx to the PRG and generates an n-bit numeric value r'[3] as an output of the PRG.

Further, the apparatus 3 also supplies the key L2 and the index idx to the PRG and generates an n-bit numeric value r'[2] as an output of the PRG.

Then, the apparatus 3 obtains $$r[3]=r'[3]-r'[2] \bmod p \qquad (24).$$

The following holds:

$$r[1]+r[2]+r[3]=r'[1]-r'[3]+r'[2]-r'[1]+r[3]-r[2]=0 \bmod p \qquad (25)$$

and all N sets satisfy the above condition.

From the value (Math. (22))

$$r[1]=r'[1]-r'[3] \bmod p$$

generated by the apparatus 1, one realizes that the apparatus 3 cannot obtain r'[1], and the apparatus 2 cannot obtain r'[3]. From this, it can be seen that the apparatus 1 and the apparatus 2 cannot calculate r[1]. The same applies to r[2] and r[3].

As long as the setup process has been completed, the above process can be executed, even before the computation is performed, for example.

In the above described secure computation using (2, 3) threshold type RSS, if p=2, multiplication can be regarded as AND (logical product) processing and addition/subtraction can be regarded as exclusive OR (XOR) processing. Thus, when p=2, the above computation becomes secure computation suitable for logic operation.

Further, when it is assumed that all the items of share information of the apparatuses 1 to 3 are (1, 1), (1, 1), and (1, 1), these become share information of 1, with r1=1, r2=1, and r3=1. This forms a complete system with a logical product (AND), an exclusive OR (XOR), and a constant 1 to allow arbitrary operations to be executed. The above method is described in Non-Patent Literature 1 for example. Various variations can be adopted for such a method.

For instance, regarding $$r1+r2+r3=w \bmod p, \qquad (26)$$

$$(r1-r2 \bmod p, r2),$$

$$(r2-r3 \bmod p, r3), \text{ and}$$

$$(r3-r1 \bmod p, r1) \qquad (27)$$

may be used as share information for each of the three apparatuses, respectively.

A scheme in which each of three apparatuses holds information corresponding to two different sets of r1, r2, and r3 may be referred to as (2, 3) threshold type RSS. In other words, an arbitrary operation can be processed by using (2, 3) threshold type RSS with modulo p=2.

It is, however, inefficient to execute all processing with logical operations.

Therefore, it is better to perform an operation that can be configured with multiplication and addition/subtraction by performing secure computation using (2, 3) threshold type RSS with p set to a larger value.

Further, there are some cases where it is desirable to combine a numerical operation and logical operation.

For instance, in a case where a, b and c, each being smaller than 2^4, are input and $$a*b \bmod 2^4 < c \qquad (28)$$

is processed, it is desirable to process the multiplication a*b as a numerical operation and the comparison operation (<) as a logical operation.

Although it is desirable to compute a*b as a numerical operation, it is difficult to express the process of comparing a*b with c as a numerical operation.

In order to solve such a problem, a process called bit decomposition described in Non-Patent Literature 2 is known. Bit decomposition is a process for converting share information for a numerical operation into share information for a logical operation. In bit decomposition, a share value storing a numerical value (1-bit numerical value) is converted into a share value storing bits.

For instance, a value w=5 is used and shared using (2, 3) threshold type RSS with modulo p=8, and from $$w=r1+r2+r3 \bmod p$$

$$r1=1, r2=2, r3=2. \qquad (29),$$

Then it is assumed that
  the apparatus 1 stores (r1, r2)=(1, 2) as a share value,
  the apparatus 2 stores (r2, r3)=(2, 2) as a share value, and
  the apparatus 3 stores (r3, r1)=(2, 1) as a share value.

By using bit decomposition, from these items of information, it is possible to obtain share information for each bit of 1, 0, and 1, the binary representation of w=5 (=b0101; b indicates that the number are binary).

More specifically, after bit decomposition is performed, the apparatus 1 possesses
  (1, 1) for the first bit,
  (0, 1) for the second bit,
  (1, 0) for the third bit, and
  (0, 0) for the fourth bit.
The first bit is the LSB (Least Significant Bit).
The apparatus 2 possesses
  (1, 1) for the first bit,
  (1, 1) for the second bit,
  (0, 0) for the third bit, and
  (0, 0) for the fourth bit.
The apparatus 3 possesses
  (1, 1) for the first bit,
  (1, 0) for the second bit,
  (0, 0) for the third bit, and
  (0, 0) for the fourth bit.

Regarding bit decomposition, the following describes an outline of the method described in Non-Patent Literature 2. This method performs bit decomposition in the following procedure.

It is assumed that a value r on which you want to perform bit decomposition is shared by the apparatus 1, the apparatus 2, and the apparatus 3 using r1, r2, and r3 which satisfy $$r=r1+r2+r3 \bmod p. \qquad (30).$$

Non-Patent Literature uses a Mersenne prime number represented by p=2^n−1. The properties of a Mersenne prime number contribute to the efficient computation of s in Procedure 2.

<Procedure 1>
Execute sharing of $$r12=r1+r2 \bmod p, \text{ and}$$

$$r3. \qquad (31).$$

<Procedure 2>
Determine whether or not r12+r3 is greater than p, and execute secure computation such that, if r12+r3 is greater than p (r12+r3>p), $$s=1 \quad (32)$$

otherwise (r12+r3≤p), $$s=0 \quad (33).$$

<Procedure 3>
Execute secret computation of $$r12+r3+s \bmod 2\hat{\ }n \quad (34)$$

by a full adder for each bit from a lower digit.

According to Non-Patent Literature 2, this method is able to perform bit decomposition using a total communication amount of 10n+4 bits in (2, 3) type RSS, where p is a number of n bits.

Non-Patent Literature 1

Dai Ikarashi, Koji Chida, Koki Hamada, and Katsumi Takahashi, "Streamlining Lightweight Verifiable Three-Party Secure Function Computation and Secure Database Processing Using the Same," SCIS 2011.

Non-Patent Literature 2

Dai Ikarashi, Koki Hamada, Ryo Kikuchi, and Koji Chida, "O(l) Bits Communication Bit Decomposition and O(|p'|) Bits Communication Modulus Conversion for Small k Secret-sharing-based Secure Computation", CSS 2013.

Non-Patent Literature 3

Toshinori Araki, Jun Furukawa, Yehuda Lindell, Ariel Nof, Kazuma Ohara, "High-Throughput Semi-Honest Secure Three-Party Computation with an Honest Majority.", CCS '16: Proceedings of the 2016 ACM SIGSAC Conference on Computer and Communications Security, October 2016, Pages 805-817.

SUMMARY

The disclosures of Non Patent Literatures 1 to 3 cited above are incorporated herein in their entirety by reference thereto. The following analysis is given by the inventors of the present invention.

According to Non-Patent Literature 2, bit decomposition can be performed with a communication amount of 10n+4 bits where p is a number of n bits, for instance.

It is, however, desirable to implement such a scheme whereby bit decomposition can be executed efficiently with a communication amount less than that of Non-Patent Literature 2, for example.

Accordingly, it is an object of the present invention to provide an apparatus, method, and program enabling bit decomposition and/or bit combination with a reduced communication amount in secret-sharing-based secure computation.

According to an aspect (first aspect) of the present invention, there is provided a secure computation apparatus (bit-decomposition secure computation apparatus) comprising a share value storage apparatus that stores share values obtained by using (2, 3) threshold type RSS (Replicated Secret Sharing) modulo the power of 2, a decomposed share value storage apparatus that stores a sequence of share values obtained by using (2, 3) threshold type RSS with modulo 2, and a bit-decomposition secure computation apparatus. With respect to a value w, the bit-decomposition secure computation apparatus uses r1, r2, and r3 satisfying $w=r1+r2+r3 \bmod 2\hat{\ }n$ (where mod is a modulo operation; $\hat{\ }$ is a power operator) as share information of (2, 3) threshold type RSS stored in the share value storage apparatus, and includes an addition sharing part that sums two values out of the share information by modulo $2\hat{\ }n$ arithmetic and distributes the sum using (2, 3) threshold type RSS, and a full adder secure computation part that adds the value generated by the addition sharing part by distributing the sum of the two values to share information of one remaining value other than the two values used by the addition sharing part for each digit by using secure computation of a full adder to store a computation result in the decomposed share value storage apparatus.

According to another aspect (second aspect) of the present invention, with respect to a value w, the bit-decomposition secure computation apparatus may be configured to use r1, r2, and r3 satisfying $w=r1+r2+r3 \bmod 2\hat{\ }n$ as share information of (2, 3) threshold type RSS stored in the share value storage apparatus, and comprise a full adder secure computation part that performs secure computation of $$r12=r1+r2 \bmod 2\hat{\ }n \text{(where mod is } a \text{ modulo operation; } \hat{\ } \text{ is } a \text{ power operator) and}$$

$$r123=r12+r3 \bmod 2\hat{\ }n$$

for each digit using secure computation of a full adder to store a computation result in the decomposed share value storage apparatus.

According to another aspect (third aspect) of the present invention, with respect to a n-bit value w, the bit-decomposition secure computation apparatus uses r1, r2, and r3 satisfying $w=r\_1+r\_2+r\_3 \bmod 2\hat{\ }n$ (where mod is a modulo operation; n is an integer of 2 or more; and $\hat{\ }$ is a power operator) as share information of (2, 3) threshold type RSS stored in the share value storage apparatus, and includes a carry secure computation part that performs secure computation on $c\_\{x+1\}$, $d\_\{x+1\}$ as a 2-bit carry when addition of x digits is performed for each bit for $r\_\{1, x\}$, $r\_\{2, x\}$, $r\_\{3, x\}$, $c\_\{x\}$, and $d\_\{x\}$, for $x=1, \ldots, n$, where
$r\_\{i, x\}$ is the x-th bit of $r\_i$, for $i=1, 2, 3$,
first-digit carry input $c\{1\}$ and $d\{1\}$ are 0, and
x is the number of digits from a lower digit, and
an incorporating secure computation part that stores share information based on the exclusive OR of $r\_\{1, x\}$, $r\_\{2, x\}$, $r\_\{3, x\}$, $c\_\{x\}$, and $d\_\{x\}$ in the decomposed share value storage apparatus as share information of an x-th-bit bit-decomposed value.

According to another aspect (fourth aspect) of the present invention, a secure computation apparatus comprises a decomposed share value storage apparatus that stores a sequence of share values obtained by using (2, 3) threshold type RSS (Replicated Secret Sharing) with modulo 2, a share value storage apparatus that stores share values obtained by using (2, 3) threshold type RSS with modulo 2 to the power of n, and a bit-combining secure computation apparatus. With respect to an x-th bit value $w\_x$, (x is the number of digits from a lower digit; $x=1, \ldots, n$), from a (n-bit) sequence of n items of share information (n is an integer of 2 or more) in (2, 3) threshold type RSS stored in the decomposed share value storage apparatus, the bit-combining secure computation apparatus uses $r\_\{1, x\}$, $r\_\{2, x\}$, and $r\_\{3, x\}$ satisfying $w\_x=r\_\{1, x\}+r\_\{2, x\}+r\_\{3, x\} \bmod 2$ and includes a full adder secure computation part that performs secure computation of $$r12=r\_\{1,n\}\|\ldots\|r\_\{1,1\}+r\_\{2,n\}\|\ldots\|r\_\{2,1\} \bmod 2^n$$

(where mod is a modulo operation; ^ is a power operator; ∥ is a bit concatenation operator; and $r\_\{1, x\}$, $r\_\{2, x\}$, and $r\_\{3, x\}$ are the x-th bits of r1, r2, and r3) and $$r123=r12+r\_\{3,n\}\|\ldots\|r\_\{3,1\} \bmod 2^n$$

(where mod is a modulo operation; ^ is a power operator) for each digit by using secure computation of a full adder to store a computation result in the share value storage apparatus.

According to another aspect (fifth aspect) of the present invention, with respect to a 1-bit value $w\_x$, the bit-combining secure computation apparatus uses $r\_\{1, x\}$, $r\_\{2, x\}$, and $r\_\{3, x\}$ satisfying $w\_x=r\{1, x\}+r\{2, x\}+r\{3, x\} \bmod 2$ as a sequence of n items of share information of (2, 3) threshold type RSS stored in the decomposed share value storage apparatus, and includes a carry secure computation part that performs secure computation on $c\_\{x+1\}$, $d\_\{x+1\}$, which is a 2-bit carry in bitwise addition, for $v\_\{x\}$, and $v\_\{1, x\}$, $v\_\{2, x\}$, $v\_\{3, x\}$, $c\_\{x\}$, and $d\_\{x\}$ where
$c\_\{1\}$, $d\_\{1\}$ are 0,
x is the number of digits from a lower digit, for $x=1, \ldots, n$,
$v\_\{x\}$ is the exclusive OR of $w\_x$, $c\_\{x\}$ and $d\_\{x\}$, and $v\_\{1, x\}$, $v\_\{2, x\}$, and $v\_\{3, x\}$ are share information of (2, 3) threshold type RSS constituting share information of $v\_\{x\}$, and stores the share information of $v\_\{x\}$ in the share value storage apparatus as share information of an x-th digit.

According to still other aspects (sixth to tenth aspects) of the present invention, there are provided process steps performed by the apparatuses according to the first to fifth aspects.

According to still other aspects (eleventh to fifteenth aspects) of the present invention, there are provided secure computation systems each comprising three sets of the apparatuses according to the first to fifth aspects.

According to still other aspects (sixteenth to twentieth aspects) of the present invention, there are provided programs each causing a computer apparatus to execute the processes of the apparatuses according to the first to fifth aspects.

According to still other aspects (twenty-first to twenty-fifth aspects) of the present invention, there are provided non-transitory computer-readable recoding media (for instance, semiconductor memory, electrically erasable programmable read-only memory, hard disk drive, solid-state drive, compact disc, DVD (Digital Versatile Disc), etc.) each storing a program that causes a computer apparatus to execute the processes of the apparatuses according to the first to fifth aspects.

According to the present invention, it becomes possible to perform bit decomposition and/or bit combination with a reduced communication amount in secret-sharing-based secure computation. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Figure 1:
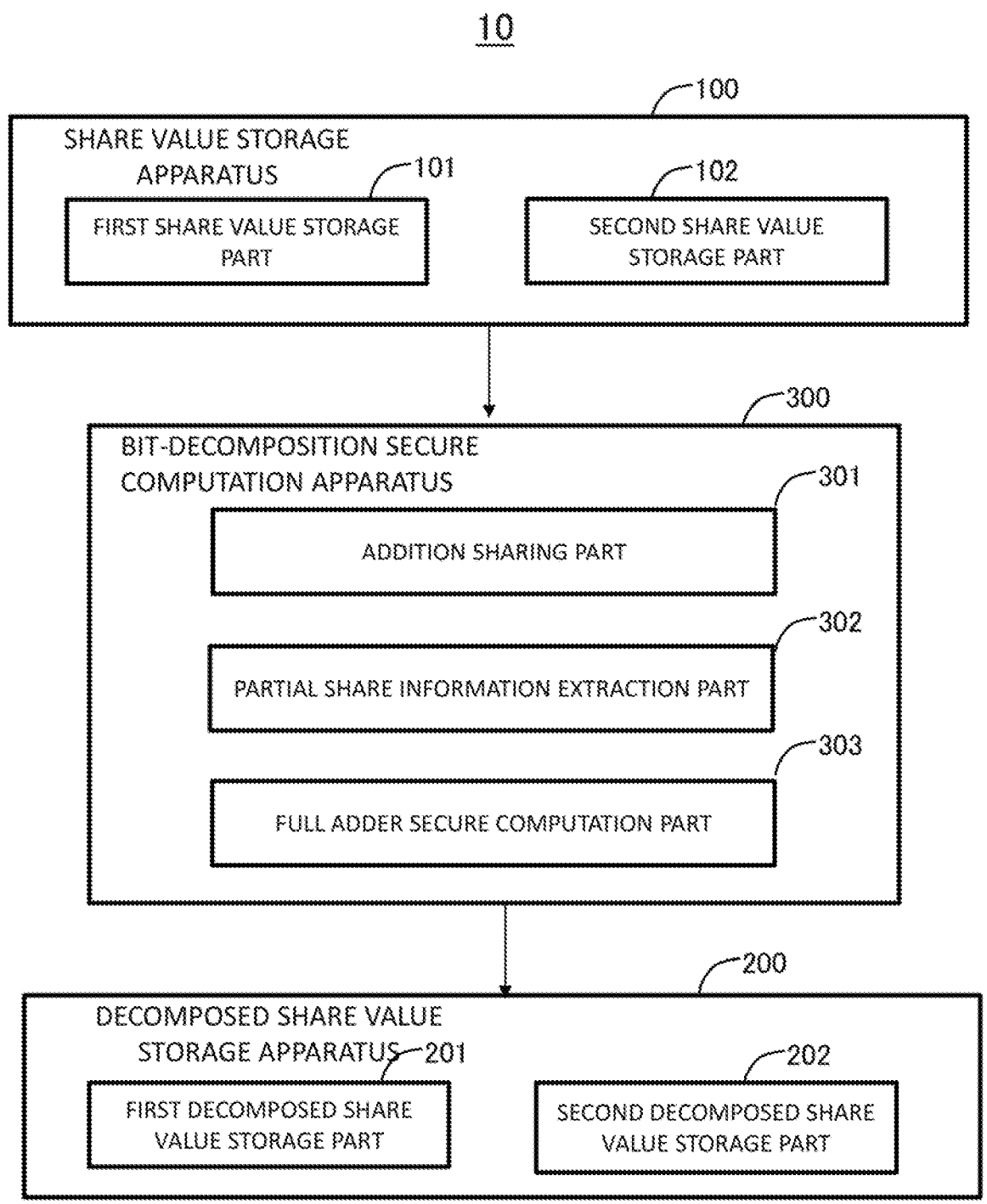
FIG. 1 is a drawing illustrating the configuration of a first example embodiment of the present invention.

According to one of embodiments of the present invention, there are provided three sets of apparatuses each including a share value storage apparatus (100 in FIG. 1) that stores share values obtained by using (2, 3) threshold type RSS (Replicated Secret Sharing) modulo the power of 2, a decomposed share value storage apparatus (200 in FIG. 1) that stores a sequence of share values obtained by using (2, 3) threshold type RSS with modulo 2, and a bit-decomposition secure computation apparatus (300 in FIG. 1).

With respect to a value w, the bit-decomposition secure computation apparatus (300 in FIG. 1) in each apparatus may be configured to use r1, r2, and r3 satisfying $$w=r1+r2+r3 \bmod 2^n$$

as share information of (2, 3) threshold type RSS stored in the share value storage apparatus (100 in FIG. 1), sum two values out of the three items of share information by modulo $2^n$ arithmetic (^ is a power operator), distribute the sum using (2, 3) threshold type RSS, and add the share values ($r\_i+r\_j \bmod 2^n$) generated by distributing the sum of the two values to one remaining value ($r\_k$, $k \neq i, j$) other than the two values used by an addition sharing part (303 in FIG. 1) for each digit by using secure computation of a full adder.

With respect to a value w, the bit-decomposition secure computation apparatus (300A in FIG. 3) in each apparatus may be configured to use r1, r2, and r3 satisfying $$w=r1+r2+r3 \bmod 2^n$$

as share information of (2, 3) threshold type RSS stored in the share value storage apparatus (100 in FIG. 3), and comprise the full adder secure computation part (303 in FIG. 3) that performs secure computation of $$r12=r1+r2 \bmod 2^n \text{ and}$$

$$r123=r12+r3 \bmod 2^n$$

for each digit using secure computation of a full adder to store a computation result in the decomposed share value storage apparatus. The bit-decomposition secure computation apparatus may be configured to include a partial share information extraction part (302 in FIG. 3) that generates share information obtained by setting the values to zero except for each one for each of the three values constituting the share information in (2, 3) threshold type RSS. The full adder secure computation part (303 in FIG. 3) may be configured to execute secure computation of a full adder sequentially from a lower digit for two values out of the three items of the share information generated by the partial share information extraction part (302 in FIG. 3), making the resulting sequence share information of the two values, and store the value obtained by combining the share information of the computation result for each digit using secure computation of a full adder for the share information of the sum of the two values and the share information of the one value in the decomposed share value storage apparatus (200 in FIG. 3).

According to another mode of the present invention, with respect to a n-bit value w, the bit-decomposition secure computation apparatus (300B in FIG. 7) may be configured to use r1, r2, and r3 satisfying $w = r\_1 + r\_2 + r\_3 \mod 2^n$ (where mod is a modulo operation; n is an integer of 2 or more; and ^ is a power operator) as share information of (2, 3) threshold type RSS stored in the share value storage apparatus (100 in FIG. 7), and include a carry secure computation part (304 in FIG. 7) that performs secure computation on $c\_\{x+1\}$, $d\_\{x+1\}$ as a 2-bit carry when addition of x digits is performed for each bit for $r\_\{1, x\}$, $r\_\{2, x\}$, $r\_\{3, x\}$, $c\_\{x\}$, and $d\_\{x\}$, for $x=1, \ldots, n$, where $r\_\{i, x\}$ is the x-th bit of $r\_i$, for $i=1, 2, 3$, first-digit carry input $c\_\{1\}$ and $d\_\{1\}$ are 0, and x is the number of digits from a lower digit, and an incorporating secure computation part (305 in FIG. 7) that stores share information based on the exclusive OR of $r\_\{1, x\}$, $r\_\{2, x\}$, $r\_\{3, x\}$, $c\_\{x\}$, and $d\_\{x\}$ in the decomposed share value storage apparatus (200 in FIG. 7) as share information of an x-th-bit bit-decomposed value.

According to yet another mode of the present invention, there may be provided a bit-combining secure computation apparatus (400 in FIG. 5) comprising a full adder secure computation part (403 in FIG. 5) that uses $r\_\{1, x\}$, $r\_\{2, x\}$, and $r\_\{3, x\}$ satisfying $w\_x = r\_\{1,x\} + r\_\{2,x\} + r\_\{3,x\} \mod 2$, with respect to an x-th bit value w ($x=1, \ldots, n$), from a (n-bit) sequence of n items of share information of (2, 3) threshold type RSS stored in the decomposed share value storage apparatus (200 in FIG. 5), performs secure computation of $r12 = r\_\{1,n\} \| \ldots \| r\_\{1,1\} + r\_\{2,n\} \| \ldots \| r\_\{2,1\}$
$\mod 2^n$ (where mod is a modulo operation; ^ is a power operator; $\|$ is a bit concatenation operator; and $r\_\{1, i\}$, $r\_\{2, i\}$, and $r\_\{3, i\}$ are the i-th bits of r1, r2, and r3) and $r123 = r12 + r\_\{3,n\} \| \ldots \| r\_\{3,1\} \mod 2^n$ for each digit by using secure computation of a full adder, and stores a computation result in the share value storage apparatus (100 in FIG. 5).

According to another mode of the present invention, with respect to a 1-bit value w_x, a bit-combining secure computation apparatus (400A in FIG. 9) may be configured to use $r\_\{1, x\}$, $r\_\{2, x\}$, and $r\_\{3, x\}$ satisfying $w\_x = r\{1, x\} + r\{2, x\} + r\{3, x\} \mod 2$ as a sequence of n items of share information of (2, 3) threshold type RSS stored in the decomposed share value storage apparatus (200 in FIG. 9), and include a carry secure computation part (404 in FIG. 9) that performs secure computation on $c\_\{x+1\}$, $d\_\{x+1\}$, which is a 2-bit carry in bitwise addition, for $v\_\{x\}$, and $v\_\{1, x\}$, $v\_\{2, x\}$, $v\_\{3, x\}$, $c\_\{x\}$, and $d\_\{x\}$ where $c\_\{1\}$, $d\_\{1\}$ are 0, x is the number of digits from a lower digit, for $x=1, \ldots, n$, $v\_\{x\}$ is the exclusive OR of w_x, $c\_\{x\}$ and $d\_\{x\}$, and $v\_\{1, x\}$, $v\_\{2, x\}$, and $v\_\{3, x\}$ are share information of (2, 3) threshold type RSS constituting share information of $v\_\{x\}$, and stores the share information of $v\_\{x\}$ in the share value storage apparatus (100 in FIG. 9) as share information of an x-th digit.

The carry secure computation part (404 in FIG. 9) may be configured to compute $c\_\{x+1\}$ by performing secure computation on $[(v\_\{1, x\} \text{ XOR } v\_\{2, x\} \text{ XOR } 1) \text{ AND } (v\_\{1, x\} \text{ XOR } v\_\{3, x\})] \text{ XOR } v\_\{3, x\}$, and compute $d\_\{x+1\}$ by performing secure computation on $[(c\_\{x\} \text{ XOR } d\_\{x\} \text{ XOR } 1) \text{ AND } (c\_\{x\} \text{ XOR } v\_\{x\})] \text{ XOR } v\_\{x\}$.

Figure 9:
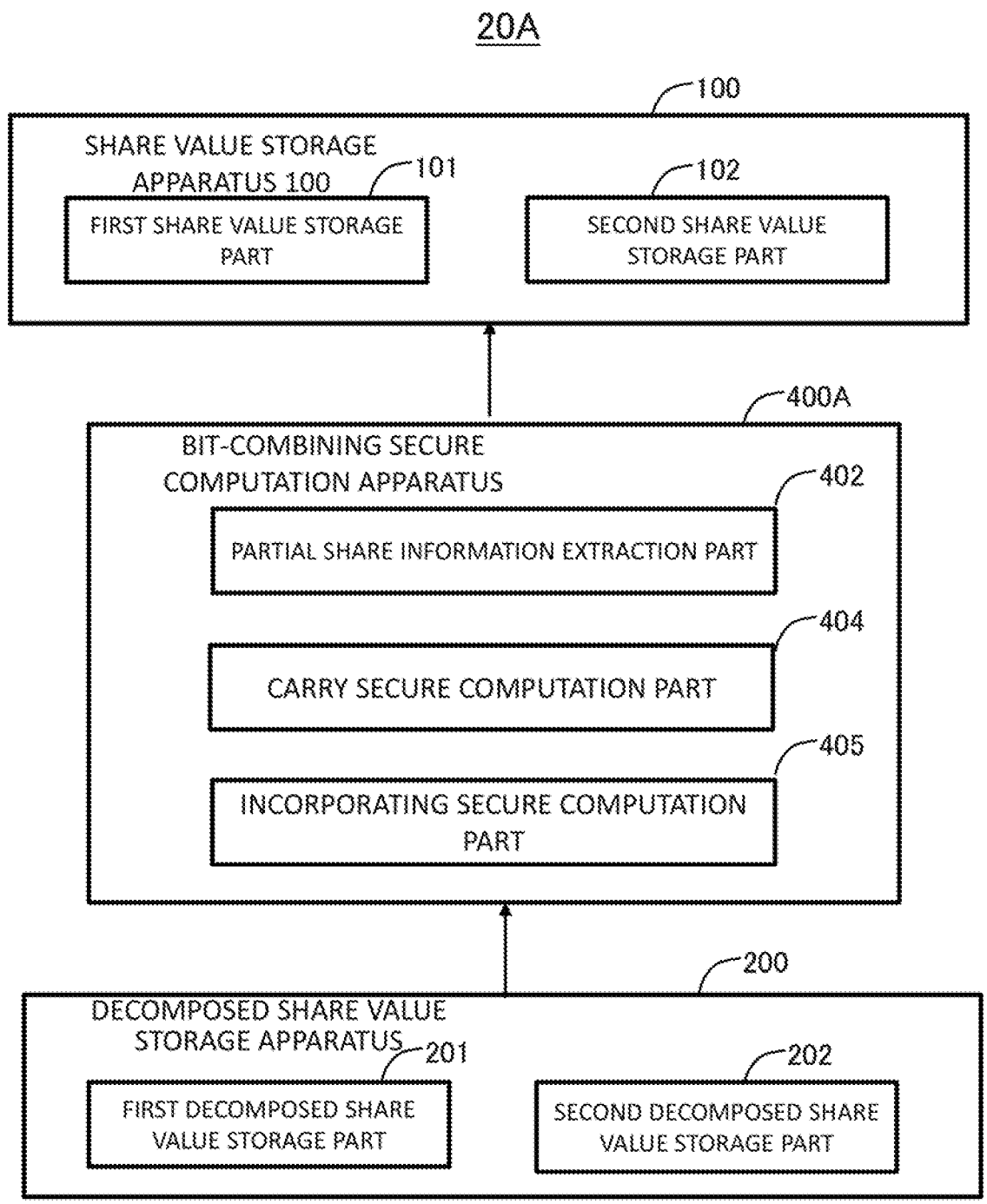
FIG. 9 is a drawing illustrating the configuration of a fifth example embodiment of the present invention.

The bit-combining secure computation apparatus (400 in FIG. 9) may be configured to include an incorporating secure computation part (405 in FIG. 9) that receives an x-th digit r_x of share information of r in (2, 3) threshold type RSS read from the decomposed share value storage apparatus (200 in FIG. 9) and share information of a 2-bit carry with respect to share information of the x-th digit supplied by the carry secure computation part as input, performs secure computation that computes the exclusive OR of these three values, and stores a computation result r_x' in the share value storage apparatus (100 in FIG. 9) as share information of the x-th digit, and a partial share information extraction part (402 in FIG. 9) that outputs share information in which values other than the portion related to $r\_\{i, x\}'$ are assumed to be 0, for $i=1, 2, 3$ from the share information of r_x', and the carry secure computation part (404 in FIG. 9) may be configured to receive three sets of x-th digits of the share information of (2, 3) threshold type RSS generated by the partial share information extraction part (402 in FIG. 9) and share information with respect to a 2-bit carry from an (x−1)-th digit as input, execute secure computation that computes a 2-bit carry generated from five sets of inputs, and supply the result to the incorporating secure computation part (405 in FIG. 9).

The following describes the principles of the present invention.

In the method of Non-Patent Literature 2, r3 is shared in Procedure 1 described above. A method for executing this processing without communication will be described. Suppose that a value r is shared by the apparatus 1, the apparatus 2, and apparatus 3 using r1, r2, and r3 satisfying $r = r1 + r2 + r3 \mod p$ (35)

in (2, 3) threshold type RSS.

At this time, if one wishes to generate shares related to ri (i=1, 2, 3), the value obtained by setting all the values to zero other than a portion relating r1 in share information (information shared by the apparatuses 1 to 3) of r=r1+r2+r3 mod p is the share information of r1.

Suppose that, as the share information of the value r, the apparatus 1 retains (r2, r3), the apparatus 2 retains (r3, r1), and the apparatus 3 retains (r1, r2).

For instance, if everything other than a portion relating to r1 is set to zero in these items of share information, the apparatus 1 will have (0, 0), the apparatus 2 will have (0, r1), and the apparatus 3 will have (r1, 0).

These can become share information relating to r1.

The fact that the apparatuses 2 and 3 retain r1 has no influence on confidentiality. This is because these are values that can be grasped from the beginning. Similarly, for r2 and r3, the apparatuses 1, 2, and 3 can obtain the share information thereof without communicating with each other.

Procedure 3 described above in the method of Non-Patent Literature 2 computes $$r12+r3+s \bmod 2^n \quad (36)$$

s is added in order to obtain $$r12+r3 \bmod p \quad (37)$$

in the computation of mod $2^n$.

In the case of s=1, if r12+r3=r'+p, the following holds:

$$r12 + r3 + s \bmod 2 \wedge n =$$
$$r' + p + 1 \bmod 2 \wedge n = r' + 2 \wedge n \bmod 2 \wedge n = r' \bmod 2 \wedge n \quad (38)$$
$$(\because p = 2 \wedge n - 1, 2 \wedge n \bmod 2 \wedge n = 0).$$

In the case of s=0, if r12+r3=r', $$r12+r3 \bmod 2^n = r' \bmod 2^n. \quad (39)$$

As shown in the above, irrespective of the value of s, the computation result of Procedure 3 will be $$r12+r3 \bmod 2^n. \quad (40)$$

If $2^n$ is used as p, the processing (Procedure 2 described above) that is executed when r12+r3 exceeds p=$2^n$ is unnecessary.

The following describes a bit decomposition method as one of embodiments of the present invention with the above described modification added.

<Procedure 1>
Execute sharing of $$r12=r1+r2 \bmod 2^n \quad (41)$$

using (2, 3) threshold type RSS.

<Procedure 2>
The apparatuses 1, 2, and 3 generate shares of r3 (no communication).

<Procedure 3>
Execute secure computation of a full adder for each bit from a lower digit to compute $$r12+r3 \bmod 2^n \quad (42).$$

The following evaluates the communication amount of the above processing.

Let's assume that randomly selected r1, r2, and r3 satisfying $$w=r1+r2+r3 \bmod 2^n \quad (43)$$

are generated and stored as follows.
 (r1, r2) is stored as a share value of w in the apparatus 1.
 (r2, r3) is stored as a share value of w in the apparatus 2.
 (r3, r1) is stored as a share value of w in the apparatus 3.

<The Communication Amount of Procedure 1>
Secret sharing of $$r1+r2 \quad (44)$$

is performed by the apparatus 1.
First, the apparatus 1 computes $$r12=r1+r2 \bmod 2^n \quad (45)$$

and randomly selects r12A and r12B satisfying $$r12A+r12B=r12 \bmod 2^n \quad (46)$$

Next, the apparatus 1 sends
 r12A to the apparatus 2 (n bits) and
 r12B to the apparatus 3 (n bits).
As a result,
 the apparatus 1 obtains (r12B, r12A) as a share value of r12.
 The apparatus 2 obtains (r12A, 0) as a share value of r12.
 The apparatus 3 obtains (0, r12B) as a share value of r12.
In this process, 2n-bit communication is performed.

<The Communication Amount of Procedure 2>
As described above, share information of r3 can be generated without communication among the apparatuses 1, 2, and 3.

<The Communication Amount of Procedure 3>
The secure computation of an full adder in each apparatus requires one AND (logical product) operation in order to calculate the carry of each digit. Therefore, in the case of addition of n digits, for secure computation of an (n−1)-bit carry, communication of 3*(n−1) bits among the apparatuses 1, 2, and 3 is required.

As a result, it can be seen that the bit decomposition can be calculated with the total communication amount of $$2n+3*(n-1)=5n-3 \text{(bits)} \quad (47)$$

The following describes an example showing how to divide the computation result into bit units using adder processing.

The computation process of bit decomposition will be described for p=8, w=6 (b110) (b indicates that the number are binary), r1=3 (b011), r2=2 (b010), r3=1 (b001) (w (=6)=r1+r2+r3 mod p (=$2^3$=8)=3+2+1 mod 8).

Note that, in the following,
ri_j denotes the j-th digit of ri from the LSB (Least Significant Bit), and
r12_j denotes the j-th digit of $$r12=r1+r2 \bmod 8 \quad (48)$$

from the LSB. Further,
r123_j denotes the j-th digit of $$r123=r1+r2+r3 \bmod 8 \quad (49)$$

from the LSB.

Next, a procedure for sequentially computing $$r12+r3 \bmod 8=(3+2)+1 \bmod 8=(5+1)\bmod 8=6 \quad (50)$$

from the lowest digit will be described.

<Computation of the First Digit (LSB)>

$$r123\_1=r12\_1 XOR r3\_1=1 XOR 0 XOR 1=0 \quad (51)$$

(r12_1 is given by the XOR (exclusive OR) of r1_1=1 and r2_1=0, and r3_1 is 0).

A carry c1 with respect to the computation of the first digit is as follows:

$$c1=r12\_1 \text{ AND } r3\_1=1 \text{ AND } 1=1 \quad (52)$$

(In the first digit, there is no carry from a lower digit.)
<Computation of the Second Digit>

$$r123\_2=r12\_2 XOR r3\_2 XOR c1=0 XOR 0 XOR 1=1 \quad (53)$$

A carry c2 with respect to the computation of the second digit is given as follows:

$$c2=c1 XOR (1 XOR r12\_2 XOR r3\_2) \text{AND} (r3\_2 XOR c1)$$
$$=1 XOR (1 XOR 0 XOR 0) \text{AND} (0 XOR 1)=0 \quad (54)$$

<Computation of the Third Digit>

$$r123\_3=r12\_3 XOR r2\_3 XOR c2=1 XOR 0 XOR 0=1 \quad (55)$$

As described above, it is possible to compute the value obtained by decomposing each digit from the first to the third bit by bit with one AND process as follows.

$$r123\_1 = 0$$

$$r123\_2 = 1$$

$$r123\_3 = 1 \quad (56)$$

This process can be executed with secure computation based on (2, 3) threshold type RSS. The result of the secure computation is a share value of the value obtained from decomposition for each bit.

The above case describes an example in which, as (2, 3) threshold type RSS, for instance, the apparatus 1 holds (r1, r2),
the apparatus 2 holds (r2, r3), and
the apparatus 3 holds (r3, r1)

as share information where the value r is given as follows.

$$r = r1 + r2 + r3 \bmod p \quad (57)$$

However, the present example embodiment is applicable as long as it is (2, 3) threshold type RSS that holds information corresponding to two different values out of three values r1, r2, and r3. For instance, the apparatus 1 may hold $$(r2 + r3, r3)$$

instead of (r2, r3) as share information, or it may even hold $$(r2 - r3, r2 + r3), \text{etc.}$$

Secure computation can be implemented as long as it includes addition, multiplication and a constant.

In the present example embodiment, $$r12 = r1 + r2 \bmod 2^n \quad (58)$$

may be first calculated by secure computation, and then an operation on $$r12 + r3 \bmod 2^n \quad (59)$$

may be executed with secure computation by a full adder.

When this method is used, the communication amount required to calculate r12 is 3n bits, which is rather inefficient as compared with a case where the distribution is performed by the apparatus 1, but the total communication amount is 6n−3 bits.

When the computation of r1+r2 is performed by secure computation of a full adder, since there is no need to perform computation for a carry generated from the most significant digit, the computation on r12 can be executed with a communication amount of 3n−3 bits. In this case, it is possible to execute bit decomposition with a communication amount of 6n−6 bits. These variations are also more efficient than the method according to Non-Patent Literature 2.

Further, by executing both processes using secure computation of a full adder, it is possible to use a mechanism that gives tolerance against fraud to the secure computation method using (2, 3) threshold type RSS as described in Non-Patent Literature 3.

Further, share information for a combined value may be created from bit-decomposed share information. In this case, carry computation for each carry from a lower digit to a higher digit is executed by secure computation, and when carry computation for all the digits is finished, the secure computation result of each digit are combined. In this method, no party holds information equivalent to r1+r2 mod $2^n$. As a result, both operations of r12=r1+r2 mod $2^n$ and r12+r3 mod $2^n$ are executed by secure computation of a full adder.

When the computation of the full adder is executed sequentially from a lower digit, n−1 AND operations are generated. As a result, communication is performed among the apparatuses n−1 times. In order to reduce this number, a carry save adder may be used. In this case, the number of AND operations increases but the depth of the circuit can be made shallow.

Example Embodiment 1

The configuration and operation of the first example embodiment of the present invention will be described with reference to the drawings. In the first embodiment, when sharing of w is performed by a (2, 3) threshold type RSS scheme using r1, r2, and r3 randomly selected to satisfy $$w = r1 + r2 + r3 \bmod 2^n \quad (60),$$

one apparatus distributes $$r12 = r1 + r2 \bmod 2^n \quad (61)$$

to the other apparatuses using replicated secret sharing, and executes $$r12 = r3 \bmod 2^n \quad (62)$$

by using secure computation of a full adder, thereby generating bit-decomposed share information.

FIG. 1 is a drawing illustrating the configuration of the first example embodiment. With reference to FIG. 1, a secure computation apparatus 10 that performs bit decomposition in the first example embodiment includes the share value storage apparatus 100, the decomposed share value storage apparatus 200, and the bit-decomposition secure computation apparatus 300.

The share value storage apparatus 100 stores share values obtained by using (2, 3) threshold type RSS with $2^n$ as p in $$w = r1 + r2 + r3 \bmod p \quad (63).$$

The decomposed share value storage apparatus 200 stores bit-decomposed share information, The bit-decomposition secure computation apparatus 300 reads values stored in the share value storage apparatus 100 and stores the values in the decomposed share value storage apparatus 200.

In the system of the first example embodiment, a set of the apparatuses 100, 200, and 300 in FIG. 1 constitute an apparatus 10, and three sets of the apparatuses 10 are provided (the three sets of the apparatuses 10 correspond to the apparatuses 1, 2, and 3, respectively, described above with respect to (2, 3) threshold type RSS). The apparatuses 100, 200, and 300 or any two apparatuses selected from the apparatuses 100, 200, and 300 may be provided in one unit, or may be provided in a distributed manner. For instance, at least between the apparatuses 100 and 200, and between the apparatuses 200 and 300, there may be provided one or more communication paths such as a local area network (LAN) and/or wide area network (WAN).

Note that, in FIG. 1, an arrow between the apparatuses 100 and 300, and an arrow between the apparatuses 300 and 200 simply show examples of data flows schematically. It goes without saying that communication between the apparatuses 100 and 300, and communication between the apparatuses 300 and 200 are not limited to the direction of the arrows. This also applies to the other example embodiments described later.

Regarding a first share value and a second share value distributed using (2, 3) threshold type RSS, the share value storage apparatus 100 includes a first share value storage part 101 that stores the first share value and a second share value storage part 102 that stores the second share value. The first share value storage part 101 and the second share value storage part 102 store each share value in such a way that it can be understood which values out of the three values used to generate share information using (2, 3) threshold type RSS are used and how the values are processed to obtain the stored share value.

The decomposed share value storage apparatus 200 includes a first decomposed share value storage part 201 and a second decomposed share value storage part 202 that store a sequence obtained by bit-decomposing the first share value (sequence of values shared using (2, 3) threshold type RSS with modulo 2). The first decomposed share value storage part 201 and the second decomposed share value storage part 202 that store a sequence obtained by bit-decomposing the second share value (sequence of values shared using (2, 3) threshold type RSS with modulo 2) store each share value in such a way that it can be understood which values out of the three values used to generate share information using (2, 3) threshold type RSS are used and how the values are processed to obtain the stored share value.

The bit-decomposition secure computation apparatus 300 includes an addition sharing part 301, the partial share information extraction part 302, and the full adder secure computation part 303.

The bit-decomposition secure computation apparatus 300 reads the values stored in the share value storage apparatus 100, communicates with another bit-decomposition secure computation apparatus 300 (not shown), and stores information in the decomposed share value storage apparatus 200.

Using two indices out of the three values constituting share information of (2, 3) threshold type RSS as input, the addition sharing part 301 reads the values stored in the share value storage apparatus 100. When the share value storage apparatus 100 stores both of the two indices, the addition sharing part 301 generates share information using (2, 3) threshold type RSS with respect to the sum thereof and sends the generated share information to the other two apparatuses.

Using one index out of the three values constituting share information of (2, 3) threshold type RSS as input, the partial share information extraction part 302 reads the value stored in the share value storage apparatus 100, and outputs share information obtained by setting all the values to zero except for one of the three values constituting the share information in (2, 3) threshold type RSS.

The full adder secure computation part 303 performs addition processing using secure computation of a full adder on the share information using (2, 3) threshold type RSS generated and distributed by the addition sharing part 301 and the share information using (2, 3) threshold type RSS generated by the partial share information extraction part 302, and stores the value obtained by combining the share information of the computation result obtained for each bit (each digit) in the decomposed share value storage apparatus 200.

Figure 2:
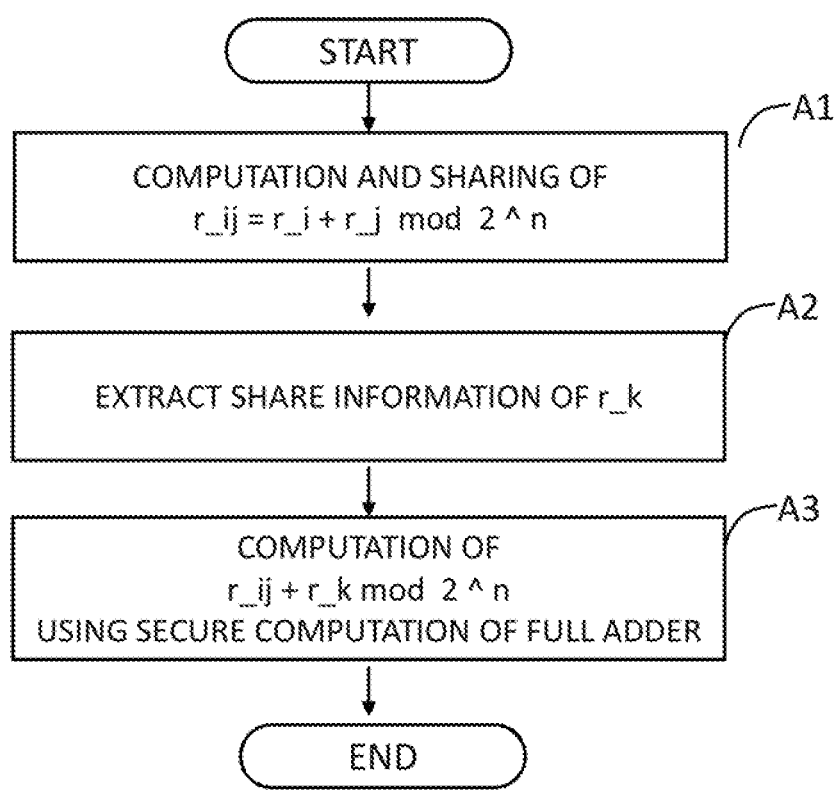
FIG. 2 is a flowchart illustrating the operation of the first example embodiment of the present invention.

FIG. 2 is a flowchart illustrating the operation of the first example embodiment of the present invention.

It is assumed that the share value storage apparatus 100 stores share values of an n-bit value r obtained by using (2, 3) threshold type RSS using $r\_1$, $r\_2$, and $r\_3$ satisfying $$r = r\_1 + r\_2 + r\_3 \bmod 2^n \quad (64).$$

In the present example embodiment, $$r\_ij = r\_i + r\_j \bmod 2^n \quad (65)$$

is shared, and addition of $r\_ij$ and $r\_k$ is executed by secure computation of a full adder. Any combination of i, j, and k may be used as long as they are different from each other and selected from a combination of values 1, 2 and 3 (no duplication).

The following processing is executed by the three sets of the share value storage apparatuses 100, the decomposed share value storage apparatuses 200, and the bit-decomposition secure computation apparatuses 300.

<Step A1>
Each addition sharing part 301 determines whether or not the share value storage apparatus 100 associated with the bit-decomposition secure computation apparatus 300 stores information on $r\_i$ and $r\_j$. If so, each addition sharing part 301 computes $$r\_ij = r\_i + r\_j \bmod 2^n \quad (66)$$

and then sends share information to the addition sharing parts 301 of the other bit-decomposition secure computation apparatuses 300. Then each apparatus outputs the share information of $r\_ij$.

<Step A2>
Next, the partial share information extraction part 302 outputs partial share information in which the values other than the portion related to $r\_k$ are set to 0 from the values stored in the share value storage apparatus 100.

<Step A3>
Next, the full adder secure computation part 303 executes addition processing $$r\_ij + r\_k \bmod 2^n \quad (67)$$

using secure computation of a full adder with respect to the share information of $r\_ij$ and the share information of $r\_k$. Then the full adder secure computation part 303 stores a sequence of the addition processing results (the value obtained by combining the share information of the computation result obtained for each bit (each digit)) in the decomposed share value storage apparatus 200.

Example Embodiment 2

The following describes the configuration and operation of a second example embodiment of the present invention with reference to the drawings. In the second example embodiment, when w is shared by (2, 3) threshold type RSS using r1, r2, and r3 satisfying $$w = r1 + r2 + r3 \bmod 2^n \quad (68)$$

$$r12 = r1 + r2 \bmod 2^n \quad (69)$$

is computed by secure computation of a full adder, and $$r12 + r3 \bmod 2^n \quad (70)$$

is computed from lower bits by secure computation of a full adder. Note that Math. (68)-(70) are the same as Math. (60)-(62).

Figure 3:
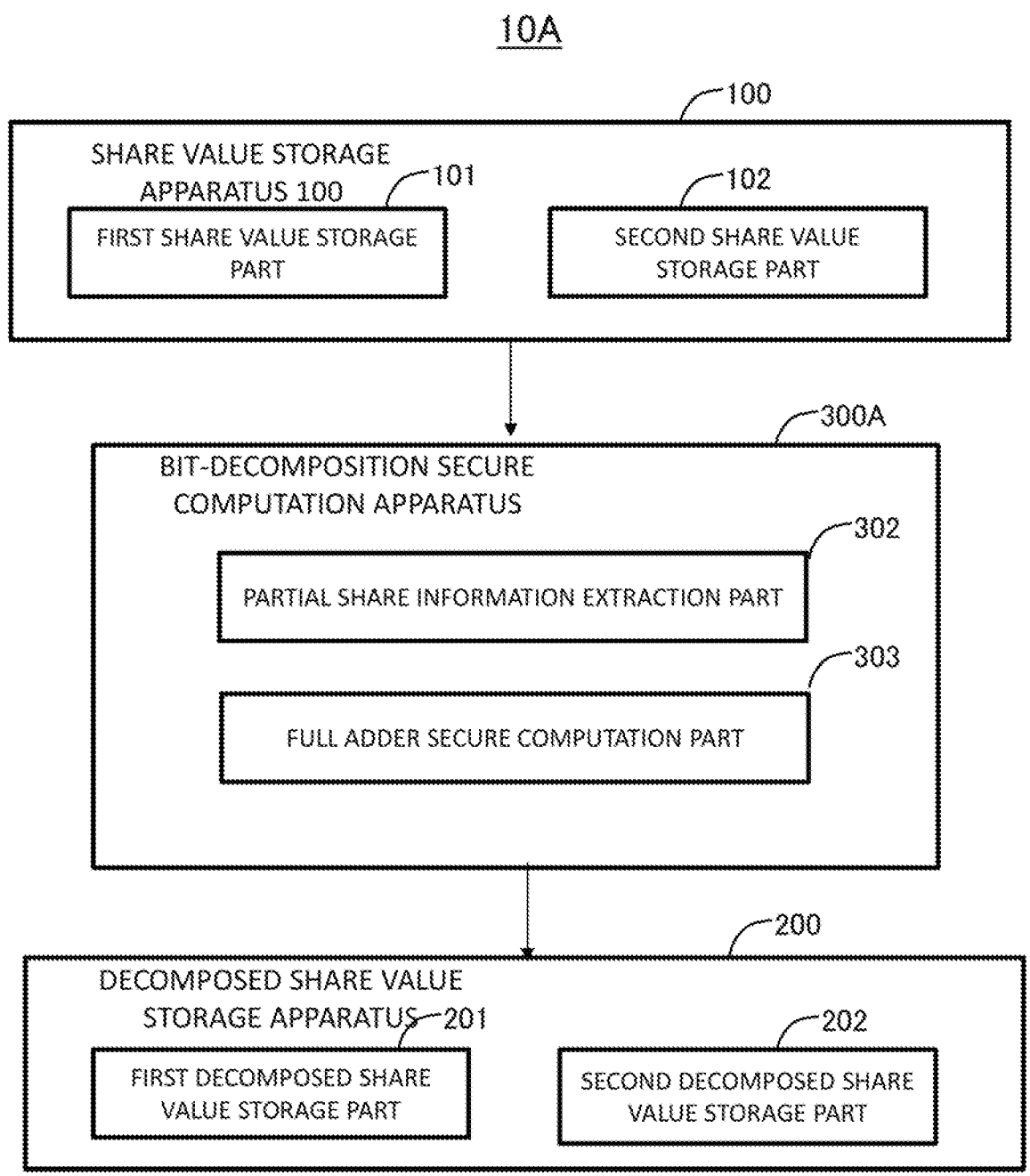
FIG. 3 is a drawing illustrating the configuration of a second example embodiment of the present invention.

FIG. 3 is a drawing illustrating the configuration of the second example embodiment. With reference to FIG. 3, a secure computation apparatus 10A according to the second example embodiment includes the share value storage apparatus 100 that stores share values obtained by using (2, 3) threshold type RSS with $2^n$ as p, the decomposed share value storage apparatus 200 that stores bit-decomposed share information, and the bit-decomposition secure computation apparatus 300A that reads the values stored in the share value storage apparatus 100 and stores values in the decomposed share value storage apparatus 200. Further, as in the first example embodiment, the system of the second example embodiment is constituted by three sets of the apparatuses 10A wherein one set is constituted by the apparatuses 100, 200, and 300A.

Regarding a first share value and a second share value distributed using (2, 3) threshold type RSS, the share value storage apparatus 100 includes a first share value storage part 101 that stores the first share value and a second share value storage part 102 that stores the second share value. The first share value storage part 101 and the second share value storage part 102 store each share value in such a way that it can be understood which values out of the three values used to generate share information using (2, 3) threshold type RSS are used and how the values are processed to obtain the stored share value.

The decomposed share value storage apparatus 200 includes the first decomposed share value storage part 201 that stores a sequence obtained by bit-decomposing the first share value (sequence of values shared using (2, 3) threshold type RSS with modulo 2) and the second decomposed share value storage part 202 that stores a sequence obtained by bit-decomposing the second share value. The first decomposed share value storage part 201 and the second decomposed share value storage part 202 store each share value in such a way that it can be understood which values out of the three values used to generate share information using (2, 3) threshold type RSS are used and how the values are processed to obtain the stored share value.

The bit-decomposition secure computation apparatus 300A includes the partial share information extraction part 302 and the full adder secure computation part 303.

The bit-decomposition secure computation apparatus 300A reads the values stored in the share value storage apparatus 100, communicates with another bit-decomposition secure computation apparatus 300, and stores information in the decomposed share value storage apparatus 200.

Using one index out of the three values constituting share information of (2, 3) threshold type RSS as input, the partial share information extraction part 302 reads the value stored in the share value storage apparatus 100. The partial share information extraction part 302 outputs share information obtained by setting all the values to zero except for one of the three values constituting the share information in (2, 3) threshold type RSS.

Using three sets of share information of (2, 3) threshold type RSS generated by the partial share information extraction part 302 as input, the full adder secure computation part 303 performs secure computation of a full adder from a low bit with respect to the three values, and stores the share information of the computation result for each bit in the decomposed share value storage apparatus 200.

Figure 4:
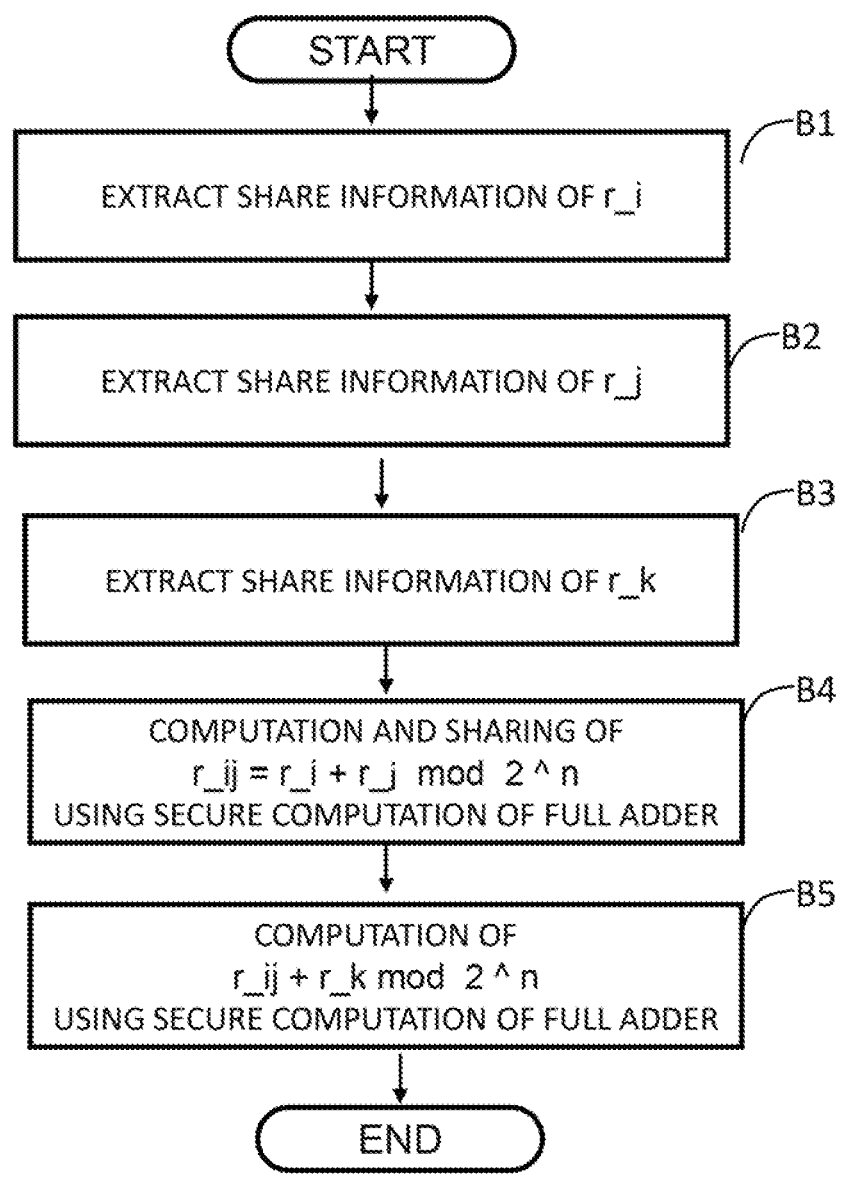
FIG. 4 is a flowchart illustrating the operation of the second example embodiment of the present invention.

FIG. 4 is a flowchart illustrating the operation of the second example embodiment.

It is assumed that the share value storage apparatus 100 stores share values of an n-bit value r obtained by using (2, 3) threshold type RSS using $r\_1$, $r\_2$, and $r\_3$ satisfying $$r=r\_1+r\_2+r\_3 \bmod 2^n \qquad (71).$$

In the operation of the present example embodiment, $$r\_ij=r\_i+r\_j \bmod 2^n \qquad (72)$$

is executed by secure computation of a full adder, and $$r\_ij+r\_k \bmod 2^n \qquad (73)$$

is executed by secure computation of a full adder. i, j, and k are values different from each other and selected from a combination of values 1, 2 and 3. The following processing is performed by the three sets of the share value storage apparatuses 100, the decomposed share value storage apparatuses 200, and the bit-decomposition secure computation apparatuses 300.

<Step B1>
First, the partial share information extraction part 302 outputs share information (referred to as "partial share information"), in which values other than the portion related to r_i are assumed to be zero, from the values stored in the share value storage apparatus 100.

<Step B2>
Next, the partial share information extraction part 302 outputs share information (referred to as "partial share information"), in which values other than the portion related to r_j are assumed to be zero, from the values stored in the share value storage apparatus 100.

<Step B3>
Next, the partial share information extraction part 302 outputs share information (referred to as "partial share information"), in which values other than the portion related to r_k are assumed to be zero, from the values stored in the share value storage apparatus 100.

<Step B4>
Next, the full adder secure computation part 303 performs secure computation of a full adder $$r\_ij=r\_i+r\_j \bmod 2^n \qquad (74)$$

with respect to the share information of r_i and the share information of r_j sequentially from a lower bit, and outputs a sequence of the results as the share information of r_ij.

<Step B5>
Next, the full adder secure computation part 303 performs secure computation of a full adder $$r\_ij+r\_k \bmod 2^n \qquad (75)$$

with respect to the share information of r_ij and the share information of r_k, and stores a sequence of the results in the decomposed share value storage apparatus 200.

Example Embodiment 3

The following describes the configuration and operation of a third example embodiment of the present invention.

In the third example embodiment, in a case where, with respect to $x=1, \ldots, n$, a x-th bit $w\_x$ (1 bit) is shared by (2, 3) threshold type RSS using share information (bit-decomposed share information) $r\_\{1, x\}$, $r\_\{2, x\}$, and $r\_\{3, x\}$ satisfying $$w\_x=r\_\{1,x\}+r\_\{2,x\}+r\_\{3,x\} \bmod 2 \qquad (76),$$

bit combining is performed by executing by secure computation of a full adder $$r12=r\_\{1,n\}\|\ldots\|r\_\{1,1\}+r\_\{2,n\}\|\ldots\|r\_\{2,1\} \bmod 2^n \qquad (77)$$

and $$r12=r12+r\_\{3,n\}\|\ldots\|r\_\{3,1\} \bmod 2^n \qquad (78)$$

Symbol "∥" is a bit concatenation operator.

Figure 5:
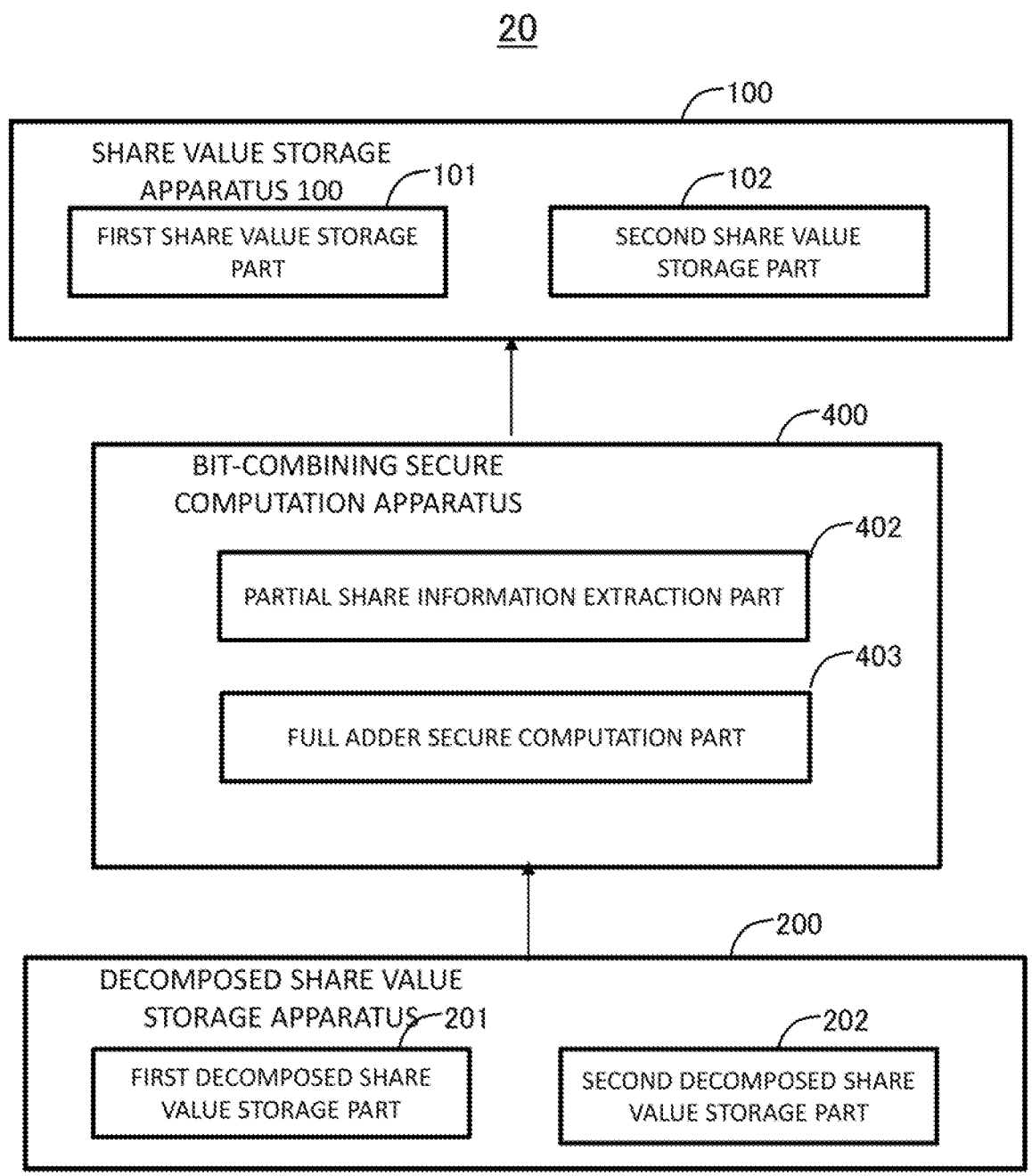
FIG. 5 is a drawing illustrating the configuration of a third example embodiment of the present invention.

FIG. 5 is a drawing illustrating the configuration of the third example embodiment. With reference to FIG. 5, a secure computation apparatus 20 (that performs bit combining) according to the third example embodiment includes the share value storage apparatus 100 that stores share values obtained by using (2, 3) threshold type RSS with $2^n$ as p, the decomposed share value storage apparatus 200 that stores bit-decomposed share information, and the bit-combining secure computation apparatus 400 that reads the values stored in the decomposed share value storage apparatus 200 and stores the values in the share value storage apparatus 100. The system of the third example embodiment is constituted by three sets of the apparatuses 20 wherein one set is constituted by the apparatuses 100, 200, and 400.

The share value storage apparatus 100 includes the first share value storage part 101 and the second share value storage part 102. The first share value storage part 101 and the second share value storage part 102 store each share value in such a way that it can be understood which values out of the three values used to generate share information using (2, 3) threshold type RSS are used and how the values are processed to obtain the stored share value.

The decomposed share value storage apparatus 200 includes the first decomposed share value storage part 201 and the second decomposed share value storage part 202. The first decomposed share value storage part 201 and the second decomposed share value storage part 202 store each share value in such a way that it can be understood which values out of the three values used to generate share information using (2, 3) threshold type RSS are used and how the values are processed to obtain the stored share value.

The bit-combining secure computation apparatus 400 includes the partial share information extraction part 402 and the full adder secure computation part 403, reads values stored in the decomposed share value storage apparatus 200, communicates with the other two sets of the bit-combining secure computation apparatus 400, and stores information in the share value storage apparatus 100. The partial share information extraction part 402 and the full adder secure computation part 403 may be constituted by the partial share information extraction part 302 and the full adder secure computation part 303 shown in FIG. 3 with the input and the output, and the direction of processing reversed.

Using one index out of the three values constituting share information of (2, 3) threshold type RSS as input, the partial share information extraction part 402 reads a value $r\_\{i, n\}\| \ldots \|r\_\{i, 1\}$ stored in the decomposed share value storage apparatus 200, and outputs share information (referred to as "partially decomposed share information") obtained by setting the values to zero except for one of the three values constituting the share information in (2, 3) threshold type RSS. The partial share information extraction part 402 reads a value $r\_\{j, n\}\| \ldots \|r\_\{j, 1\}$ stored in the decomposed share value storage apparatus 200, and outputs partial share information obtained by setting the values to zero except for one of the three values constituting the share information in (2, 3) threshold type RSS. The partial share information extraction part 402 further reads a value $r\_\{k, n\}\| \ldots \|r\_\{k, 1\}$ stored in the decomposed share value storage apparatus 200, and outputs partial share information obtained by setting the values to zero except for one of the three values constituting the share information in (2, 3) threshold type RSS.

The full adder secure computation part 403 receives as input the three sets of share information of (2, 3) threshold type RSS generated by the partial share information extraction part 402, performs secure computation of a full adder from a low bit with respect to the three values, and then stores share information of the computation result obtained for each bit in the decomposed share value storage apparatus 200.

Figure 6:
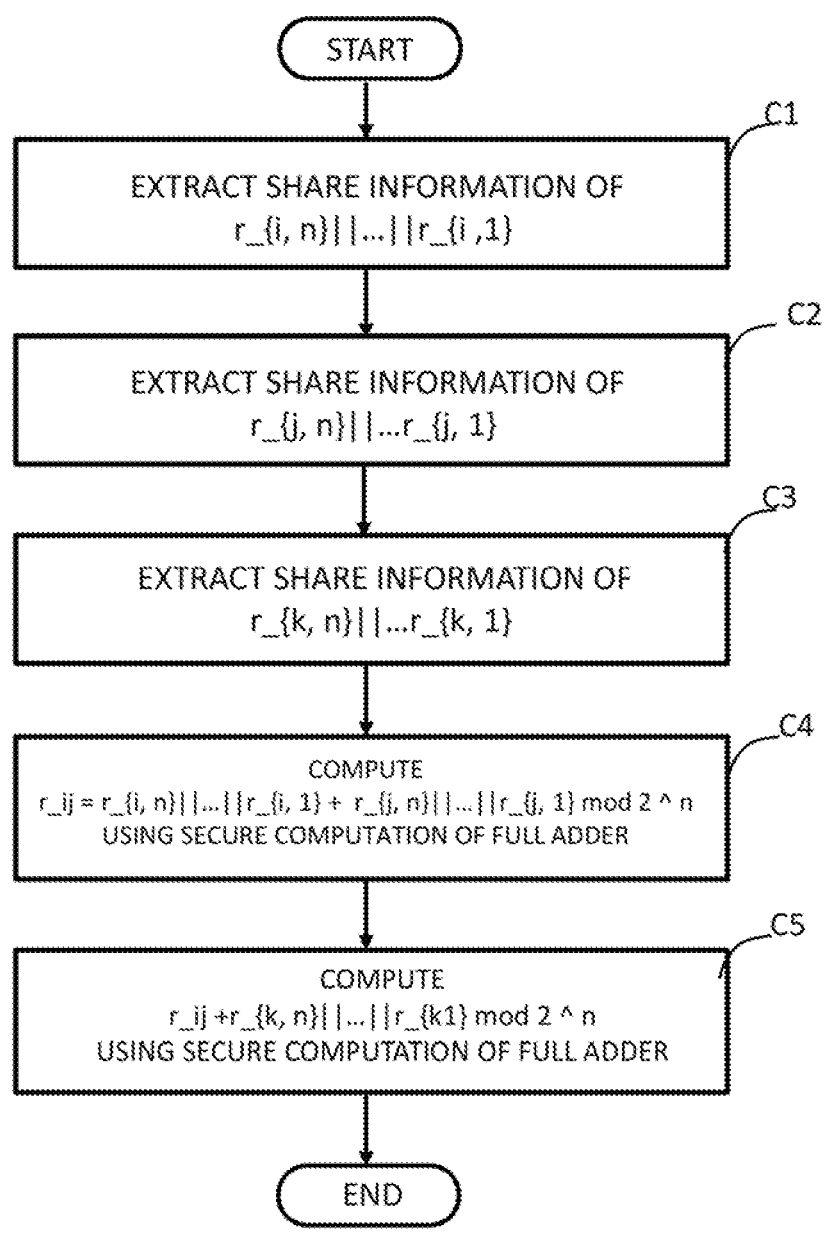
FIG. 6 is a flowchart illustrating the operation of the third example embodiment of the present invention.

FIG. 6 is a flowchart illustrating the operation of the third example embodiment. It is assumed that, with respect to each digit (bit) $r\_x$ of an n-bit value r, the decomposed share value storage apparatus 200 stores share values obtained by using (2, 3) threshold type RSS using $r\_\{1, x\}$, $r\_\{2, x\}$, $r\_\{3, x\}$ satisfying $$r\_x = r\_\{1,x\} + r\_\{2,x\} + r\_\{3,x\} \bmod 2 \tag{79}$$

$r\_\{1, x\}$, $r\_\{2, x\}$, and $r\_\{3, x\}$ are the x-th digits (i=1, n) of $r\_1$, $r\_2$, and $r\_3$.

In the operation of the present example embodiment, $$r\_{ij} = r\_\{i,n\}\| \ldots \|r\_\{i,1\} + r\_\{j,n\}\| \ldots \|r\_\{j,1\} \bmod 2 \tag{80}$$

is executed by secure computation of a full adder, and $$r\_{ij} + r\_\{k,n\}\| \ldots \|r\_\{k,1\} \bmod 2^n \tag{81}$$

is executed by secure computation of a full adder. i, j, and k are values different from each other, and selected from a combination of values 1, 2, and 3. The following processing is performed by the three sets of the share value storage apparatuses 100, the decomposed share value storage apparatuses 200, and the bit-combining secure computation apparatuses 400.

<Step C1>
First, the partial share information extraction part 402 outputs share information (share information of $r\_\{i, n\}\| \ldots \|r\_\{i, 1\}$; also referred to as partial share information), in which values other than the portion related to $$r\_\{i,n\}\| \ldots \|r\_\{i,1\} \tag{82}$$

are assumed to be zero, from the values stored in the decomposed share value storage apparatus 200.

<Step C2>
Next, the partial share information extraction part 402 outputs share information (share information of $r\_\{j, n\}\| \ldots \|r\_\{j, 1\}$; also referred to as partial share information), in which values other than the portion related to $$r\_\{j,n\}\| \ldots \|r\_\{j,1\} \tag{83}$$

are assumed to be zero, from the values stored in the decomposed share value storage apparatus 200.

<Step C3>
Next, the partial share information extraction part 402 outputs share information (share information of $r\_\{k, n\}\| \ldots \|r\_\{k, 1\}$; also referred to as partial share information), in which values other than the portion related to $$r\_\{k,n\}\| \ldots \|r\_\{k,1\} \tag{84}$$

are assumed to be zero, from the values stored in the decomposed share value storage apparatus 200 (for instance (i, j, k)=(1, 2, 3)).

<Step C4>
Next, for the partially decomposed shard information of $$r\_\{i,n\}\| \ldots \|r\_\{i,1\} \tag{85}$$

and for the partially decomposed share information of $$r\_\{j,n\}\| \ldots \|r\_\{j,1\}, \tag{86}$$

the partial share information extraction part 402 computes $$r\_{ij} = r\_\{i,n\}\| \ldots \|r\_\{i,1\} + r\_\{i,n\}\| \ldots \|r\_\{1,1\} \bmod 2 \tag{87}$$

using secure computation of a full adder, and outputs a sequence of the results as share information of $r\_{ij}$.

<Step C5>
Next, for the share information of $r\_{ij}$ and the partially decomposed share information of $$r\_\{k,n\}\| \ldots \|r\_\{k,1\} \tag{88},$$

the full adder secure computation part 403 computes $$r\_{ij} + r\_\{k,n\}\| \ldots \|r\_\{k,1\} \bmod 2^n \tag{89}$$

using secure computation of a full adder, and stores the result in the share value storage apparatus 100.

Example Embodiment 4

In the bit decomposition process of the second example embodiment described above, for r_i, r_j, and r_k, two values are added first and then another value is added, however, this process can be executed in parallel. In the fourth example embodiment of the present invention, the bit decomposition processing is performed while the processing on each digit is executed in parallel.

Specifically, the following processing (computation of z, c, d, and v) is executed sequentially from x=1 to n. XOR denotes exclusive OR. Note that the following holds.

$$c\_\{1\} = d\_\{1\} = 0 \quad (90).$$

Further, it is not necessary to calculate c_{n+1} and d_{n+1}. r_{i, x} is the x-th digit of r_i, z_{x}, v_{x}, c_{x}, and d_{x} represent the x-th digit of z, v, c, and d.

$$z\_\{x\} = r\_\{1,x\} XOR r\_\{2,x\} XOR r\_\{3,x\} \quad (91)$$

$$c\_\{x+1\} = [(r\_\{1,x\} XOR r\_\{2,x\} XOR 1) AND (r\_\{1, x\} XOR r\_\{3,x\})] XOR r\_\{3,x\} \quad (92)$$

$$d\_\{x+1\} = [(c\_\{x\} XOR d\_\{x\} XOR 1) AND [(c\_\{x\} XOR z\_\{x\})]] XOR z\_\{x\} \quad (93)$$

$$v\_\{x\} = z\{x\} XOR c\_\{x\} XOR d\_\{x\} \quad (94)$$

c_{x+1} and d_{x+1} denote a 2-bit carry generated when r_{1, x}, r_{2, x}, r_{3, x}, c_{x}, and d_{x} are added. It is a 2-bit carry since there are five inputs.

The value (z_{x} XOR c_{x} XOR d_{x}) obtained by incorporating c_{x} and d_{x} into z_{x} is equal to the x-th digit of r, and by computing this value using secure computation, it is possible to obtain values (share information) in which the x-th digit of r is shared as share information of v_{x}.

The following describes an example in which share values of 11 (decimal notation) is bit-decomposed.

For w=11, r_i=3, r_j=10, and r_k=14, the x-th digit of each is expressed as w_x, r_{i, x}, r_{j, x}, and r_{k, x}. Further, in the following calculations, i=1, j=2, and k=3.

$$w = 11 = b1011$$

$$r\_1 = 3 = b0011$$

$$r\_2 = 10 = b1010$$

$$r\_3 = 14 = b1110$$

<The First Digit Computation Results>

$$z\_\{1\} = 1$$

$$c\_\{2\} = 0$$

$$d\_\{2\} = 0$$

$$v\_\{1\} = 1 \quad (95)$$

<The Second Digit Computation Results>

$$z\_\{2\} = 1$$

$$c\_\{3\} = 1$$

$$d\_\{3\} = 0$$

$$v\_\{2\} = 1 \quad (96)$$

<The Third Digit Computation Results>

$$z\_\{3\} = 1$$

$$c\_\{4\} = 0$$

$$d\_\{4\} = 1$$

$$v\_\{3\} = 0 \quad (97)$$

<The Fourth Digit Computation Results>

$$z\_\{4\} = 0$$

$$v\_\{4\} = 1$$

$$v\_\{4\} = 1$$

$$v\_\{3\} = 0$$

$$v\_\{2\} = 1$$

$$v\_\{1\} = 1 \quad (98)$$

These are the values obtained by decomposing the value w=b1011 for each bit. This computation is executed by secure computation.

Figure 7:
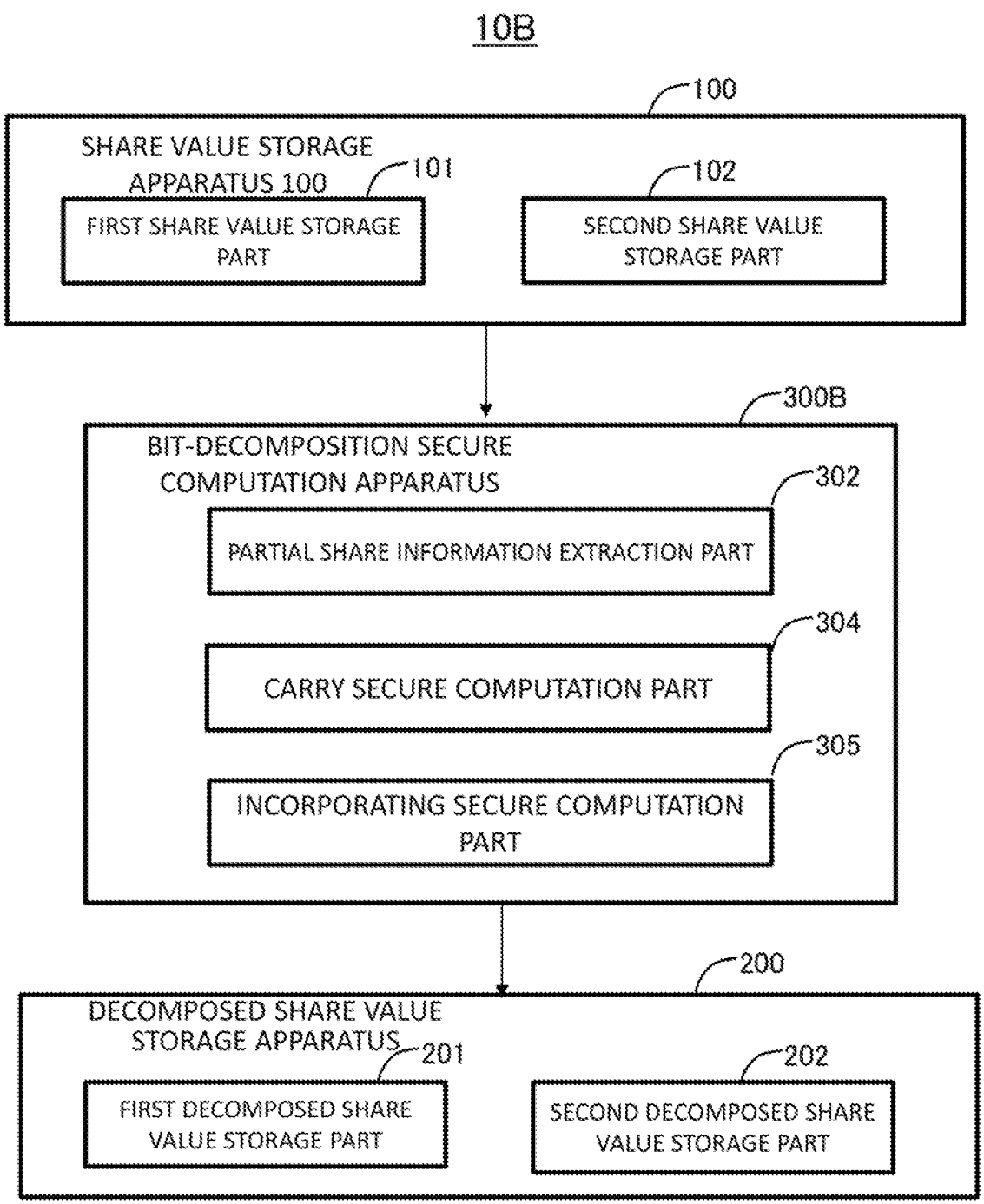
FIG. 7 is a drawing illustrating the configuration of a fourth example embodiment of the present invention.

FIG. 7 is a drawing illustrating the configuration of the fourth example embodiment. With reference to FIG. 7, a secure computation apparatus 10B (that performs bit decomposition) according to the fourth example embodiment includes the share value storage apparatus 100 that stores share values obtained by using (2, 3) threshold type RSS with 2^n as p, the decomposed share value storage apparatus 200 that stores bit-decomposed share information, and the bit-decomposition secure computation apparatus 300B that reads the values stored in the share value storage apparatus 100 and stores values in the decomposed share value storage apparatus 200. Further, the system of the fourth example embodiment is constituted by three sets of the apparatuses 10B wherein one set is constituted by the apparatuses 100, 200, and 300B.

The share value storage apparatus 100 includes the first share value storage part 101 and the second share value storage part 102. The first share value storage part 101 and the second share value storage part 102 store each share value in such a way that it can be understood which values out of the three values used to generate share information using (2, 3) threshold type RSS are used and how the values are processed to obtain the stored share value.

The decomposed share value storage apparatus 200 includes the first decomposed share value storage part 201 and the second decomposed share value storage part 202. The first decomposed share value storage part 201 and the second decomposed share value storage part 202 store each share value in such a way that it can be understood which values out of the three values used to generate share information using (2, 3) threshold type RSS are used and how the values are processed to obtain the stored share value.

The bit-decomposition secure computation apparatus 300B includes the partial share information extraction part 302, the carry secure computation part 304, and the incorporating secure computation part 305.

The bit-decomposition secure computation apparatus 300B reads the values stored in the share value storage apparatus 100, communicates with another bit-decomposition secure computation apparatus 300, and stores information in the decomposed share value storage apparatus 200.

Using one index out of the three values constituting share information of (2, 3) threshold type RSS as input, the partial share information extraction part 302 reads the value stored in the share value storage apparatus 100, and outputs share information obtained by setting all the values to zero except for one of the three values constituting the share information in (2, 3) threshold type RSS.

Using three sets of i-th digits of the share information of (2, 3) threshold type RSS generated by the partial share information extraction part 302 and share information with respect to a 2-bit carry from an (i 1)-th digit as input, the carry secure computation part 304 performs secure computation that computes a 2-bit carry generated from five sets of inputs and supplies the result to the incorporating secure computation part 305.

Using the x-th digit (r_x) of the share information of r in (2, 3) threshold type RSS read from the decomposed share value storage apparatus 200 and share information of the 2-bit carry with respect to the share information of the x-th digit supplied by the carry secure computation part 304 as input, the incorporating secure computation part 305 performs secure computation that computes the exclusive OR of these three values, and stores the result in the decomposed share value storage apparatus 200 as bit-decomposed share information of the x-th digit.

Figure 8:
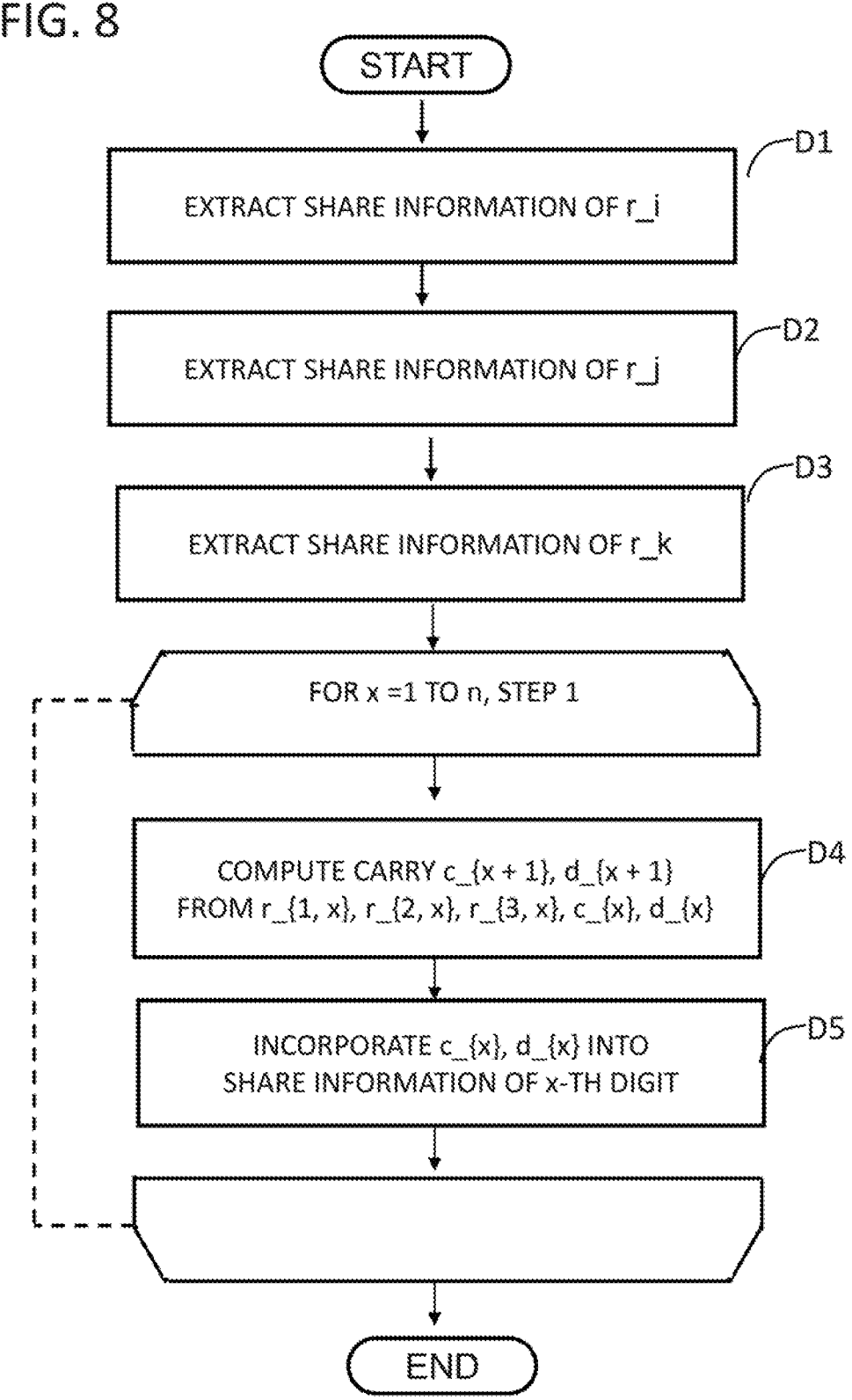
FIG. 8 is a flowchart illustrating the operation of the fourth example embodiment of the present invention.

FIG. 8 is a flowchart for explaining the operation of the fourth example embodiment. It is assumed that the share value storage apparatus 100 stores share values of an n-bit value r obtained by using (2, 3) threshold type RSS using r_1, r_2, and r_3 satisfying $$r = r\_1 + r\_2 + r\_3 \bmod 2^n \qquad (99).$$

The following processing is performed by the three sets of the share value storage apparatuses 100, the decomposed share value storage apparatuses 200, and the bit-decomposition secure computation apparatuses 300B.

Let c_{1} and d_{1} be zero.
<Step D1>
First, the partial share information extraction part 302 outputs partial share information, in which values other than the portion related to r_1 are assumed to be zero, from the values stored in the share value storage apparatus 100. Note that the i-th bit of r_1 is r_{1, i}.
<Step D2>
Next, the partial share information extraction part 302 outputs partial share information, in which values other than the portion related to r_2 are assumed to be zero, from the values stored in the share value storage apparatus 100. Note that the i-th bit of r_2 is r_{2, i}.
<Step D3>
Next, the partial share information extraction part 302 outputs partial share information, in which values other than the portion related to r_3 are assumed to be zero, from the values stored in the share value storage apparatus 100. Note that the i-th bit of r_3 is r_{3, i}.

The following processing is executed for x=1, ..., n (1-bit to n-bit).
<Step D4>
The carry secure computation part 304 receives the share information of $$r\_\{1, x\},$$

$$r\_\{2, x\}, \text{ and}$$

$$r\_\{3, x\}$$

and share information with respect to a 2-bit carry c_{x}, d_{x} from an (x−1)th digit generated by the partial share information extraction part 302 as input, performs secure computation that computes share information of a 2-bit carry c_{x+1} and d_{x+1} generated from the five sets of inputs, and supplies the results to the incorporating secure computation part 305.
<Step D5>
The incorporating secure computation part 305 receives an x-th digit of share information of r read from the share value storage apparatus 100 and the share information of the 2-bit carry c_{x}, d_{x} with respect to share information of the (x−1)-th digit supplied by the carry secure computation part 304 as input, performs secure computation that computes the exclusive OR (XOR) of the values of these three inputs, and stores a computation result in the decomposed share value storage apparatus 200 as bit-decomposed share information of the x-th digit.

Example Embodiment 5

In the bit-combining processing of the third example embodiment described above, for r_i, r_j, and r_k (i, j, k=(1, 2, 3)), two values are first added and the remaining one value is added thereafter. Using secure computation of a full adder, computation is performed sequentially from a lower digit. After $$r\_ij = r\_i + r\_j \qquad (100)$$

has been computed with respect to an x-th digit, the processing of $$r\_ij + r\_k \qquad (101)$$

can be started with respect to the x-th digit.

After (s1) r_ij=r_i+r_j has been computed with respect to the x-th digit, the processing of (s2) r_{ijk}=r_ij+r_k can be started with respect to the x-th digit.

By utilizing this, the computation of the (x+1)-th digit with respect to (s1) and the computation of the x-th digit with respect to (s2) can be executed in parallel. A fifth example embodiment is configured to perform bit combining processing while utilizing this feature. In the fifth example embodiment, the processing time can be reduced as compared with the case where bit combining is performed sequentially.

With respect to an n-bit value $$w = b \ w\_n \| \ldots \| w\_1 \qquad (102)$$

(b indicates that the number are binary), for x=1, ..., n, when each of w_x is shared as a 1-bit value, bit combining is performed by sequentially executing the following processing from x=1 to n. Let c_{1}=d_{1}=0. Further, it is not necessary to compute c_{n+1} and d_{n+1}.

The share information of v_{x} below is the share information of an x-th digit.

$$v\_\{x\} = w\_x \, XOR \, c\_\{x\} \, XOR \, d\_\{x\} \qquad (103)$$

Three values constituting the share information of v_{x} are $$v\_\{1, x\}, v\_\{2, x\}, v\_\{3, x\} \qquad (104)$$

and
c_{x+1}, d_{x+1} are computed as follows.

$$c\_\{x+1\} = [(v\_\{1, x\} XOR v\_\{2, x\} XOR 1) AND (v\_\{1, x\} XOR v\_\{3, x\})] XOR v\_\{v, 3\} \qquad (105)$$

$$d\_\{x+1\} = [(c\_\{x\} XOR d\_\{x\} XOR 1) AND (c\_\{x\} XOR v\_\{x\})] XOR v\_\{x\} \qquad (106)$$

c_{x+1} and d_{x+1} are a 2-bit carry from v_{1, x}, v_{2, x}, v_{3, x}, c_{x}, and d_{x}.

$v\_\{1, x\}$, $v\_\{2, x\}$, and $v\_\{3, x\}$ are obtained by decomposing the x-th digit share information $v\_\{x\}$ into three values, but the difference is that, before the decomposition, $c\_\{x\}$ and $d\_\{x\}$ are added exclusively (addition by XOR). Because of this, the value of the x-th digit does not change after incorporating the carry from the (x−1)-th digit to the x-th digit.

For w=11 (decimal)=b1011, w_4=1, w_3=0, w_2=1, and w_1=1, computation is performed using Math. (99)-(102).

<Computation of the First Digit>

$$v\_\{1\}=1$$

Here, when three values constituting the share information of $v\_\{1\}$ are $$v\_\{1,1\}=1$$
$$v\_\{2,1\}=1, \text{ and}$$
$$v\_\{3,1\}=1 \qquad (107),$$

the following holds.

$$c\_\{2\}=1$$
$$d\_\{2\}=0 \qquad (108)$$

<Computation of the Second Digit>

$$v\_\{2\}=0$$

Here, let three values constituting share information of $v\_\{2\}$ be $$v\_\{1,2\}=1,$$
$$v\_\{2,2\}=1, \text{ and}$$
$$v\_\{3,2\}=0 \qquad (109),$$

then the following holds.

$$c\_\{3\}=1$$
$$d\_\{3\}=0 \qquad (110)$$

<Computation of the Third Digit>

$$v\_\{3\}=1$$

Here, let three values constituting share information of $v\_\{3\}$ be $$v\_\{1,3\}=1,$$
$$v\_\{2,3\}=1, \text{ and}$$
$$v\_\{3,3\}=1 \qquad (111),$$

then the following holds.

$$c\_\{4\}=1$$
$$d\_\{4\}=1 \qquad (112)$$

<Computation of the Fourth Digit>

$$v\_\{4\}=0$$

Here, let three values constituting share information of $v\_\{4\}$ be $$v\_\{1,4\}=0,$$
$$v\_\{2,4\}=0, \text{ and}$$
$$v\_\{3,4\}=0 \qquad (113).$$

At this time, three values obtained by combining the share information constituting $v\_\{x\}$ (x=1, . . . , 4)

$$b0111,$$
$$b0111, \text{ and}$$
$$b0101 \qquad (114)$$

are bit-combined share information.

The configuration and operation of the fifth example embodiment will be described. In the fifth example embodiment, for x=1, . . . , n, a bit $w\_x$ is obtained by using (2, 3) threshold type RSS using $r\_\{i, 1\}$, $r\_\{i, 2\}$, and $r\_\{i, 3\}$ that satisfy $$w\_x=r\_\{x,1\}+r\_\{x,2\}+r\_\{x,3\} \bmod 2 \qquad (115).$$

FIG. 9 is a drawing illustrating the configuration of the fifth example embodiment of the present invention. With reference to FIG. 9, a secure computation apparatus 20A (that performs bit combining) according to the fifth example embodiment includes the share value storage apparatus 100 that stores share values obtained by using (2, 3) threshold type RSS with $2^n$ as p, the decomposed share value storage apparatus 200 that stores bit-decomposed share information, and the bit-combining secure computation apparatus 400A that reads the values stored in the decomposed share value storage apparatus 200 and stores the values in the share value storage apparatus 100. The system of the fifth example embodiment is constituted by three sets of the apparatuses 20A wherein one set is constituted by the apparatuses 100, 200, and 400A.

The share value storage apparatus 100 includes the first share value storage part 101 and the second share value storage part 102. The first share value storage part 101 and the second share value storage part 102 store each share value in such a way that it can be understood which values out of the three values used to generate share information using (2, 3) threshold type RSS are used and how the values are processed to obtain the stored share value.

The decomposed share value storage apparatus 200 includes the first decomposed share value storage part 201 and the second decomposed share value storage part 202. The first decomposed share value storage part 201 and the second decomposed share value storage part 202 store each share value in such a way that it can be understood which values out of the three values used to generate share information using (2, 3) threshold type RSS are used and how the values are processed to obtain the stored share value.

The bit-combining secure computation apparatus 400A includes the partial share information extraction part 402, the carry secure computation part 404, and the incorporating secure computation part 405, reads values stored in the decomposed share value storage apparatus 200, communicates with the other bit-combining secure computation apparatuses 400A, and stores information in the share value storage apparatus 100. The partial share information extraction part 402, the carry secure computation part 404, and the incorporating secure computation part 405 may be constituted by the partial share information extraction part 302, the carry secure computation part 304, and the incorporating secure computation part 305 of the fourth example embodiment described above with the input and the output, and the direction of processing reversed.

Using one index out of the three values constituting share information of (2, 3) threshold type RSS as input, the partial share information extraction part 402 reads the value stored in the share value storage apparatus 100, and outputs share information obtained by setting all the values to zero except for one of the three values constituting the share information in (2, 3) threshold type RSS.

Using three sets of x-th digits of the share information of (2, 3) threshold type RSS generated by the partial share information extraction part 402 and share information with respect to a 2-bit carry from an (x−1)-th digit as input, the carry secure computation part 404 performs secure computation that computes a 2-bit carry generated from five sets of inputs and supplies the result to the incorporating secure computation part 405.

Using the x-th digit (r_x) of the share information of r in (2, 3) threshold type RSS read from the decomposed share value storage apparatus 200 and share information of the 2-bit carry with respect to the share information of the x-th digit supplied by the carry secure computation part 404 as input, the incorporating secure computation part 405 performs secure computation that computes the exclusive OR of these three values, and stores the result in the share value storage apparatus 100 as share information of the x-th digit.

Figure 10:
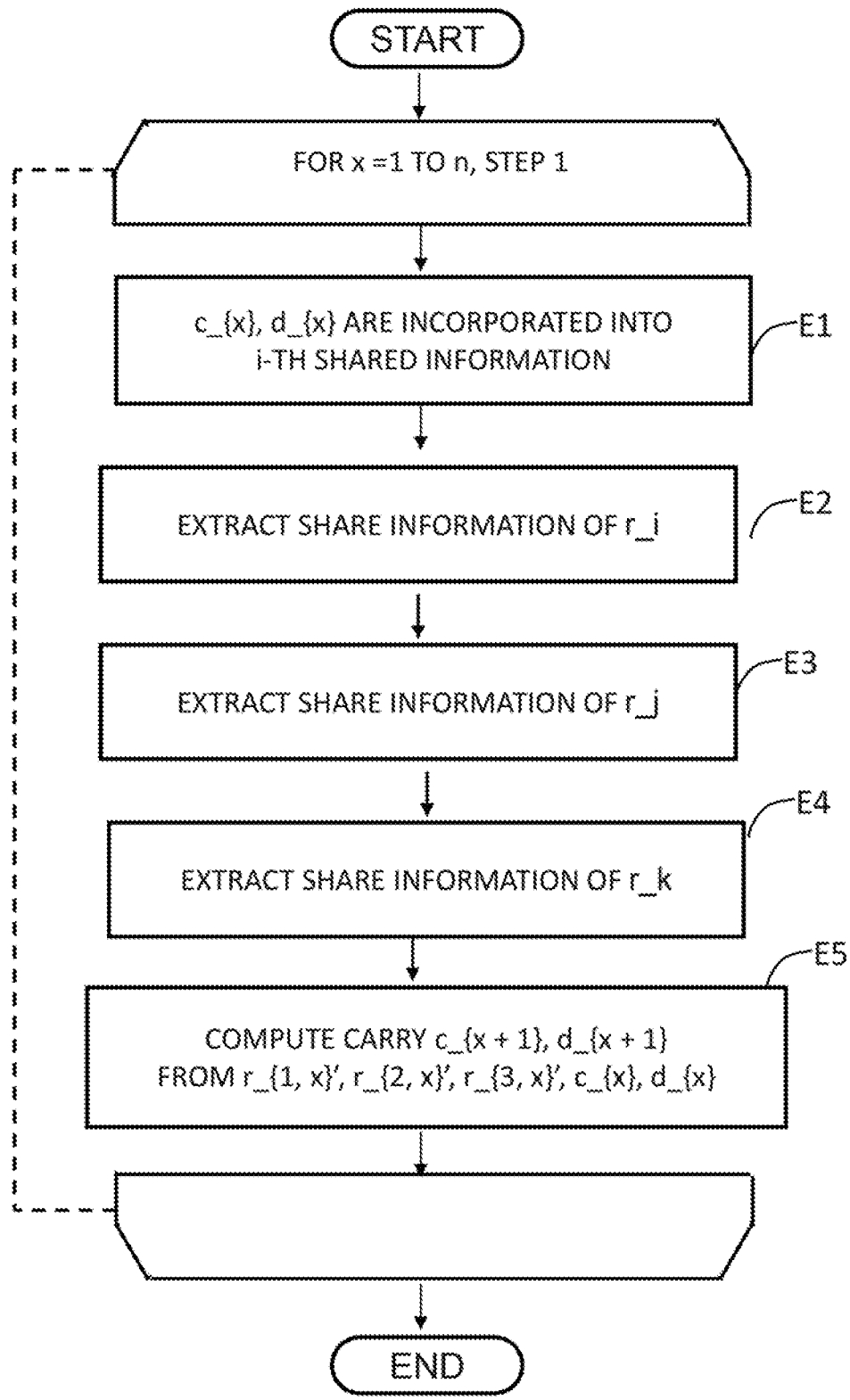
FIG. 10 is a flowchart illustrating the operation of the fifth example embodiment of the present invention.

FIG. 10 is a flowchart for explaining the operation of the fifth example embodiment. It is assumed that, with respect to each digit r_x of an n-bit value r (x=1, . . . , n), the decomposed share value storage apparatus 200 stores share values obtained by using (2, 3) threshold type RSS using $r\_\{1, x\}, r\_\{2, x\}, r\_\{3, x\}$ satisfying $$r\_x = r\_\{1,x\} + r\_\{2,x\} + r\_\{3,x\} \bmod 2 \tag{116}$$

The following processing is performed by the three sets of the share value storage apparatuses 100, the decomposed share value storage apparatuses 200, and the bit-combining secure computation apparatuses 400.

The following processing is executed for x=1, . . . , n (x is the number of digits from a lower digit). Note that $c\_\{1\}=0$ and $d\_\{1\}=0$.

<Step E1>
First, the incorporating secure computation part 405 incorporates $c\_\{x\}$ and $d\_\{x\}$ (addition by exclusive OR) into share information of an x-th digit r_x of n-bit share information r in (2, 3) threshold type RSS read from the decomposed share value storage apparatus 200. Shared information of the computation result r_x' is supplied to the partial share information extraction part 302 and r_x' is stored in the share value storage apparatuses 100 as the x-th bit of share information of the bit-combining result.

Note that r_x' is shared by the three apparatuses using $r\_\{1, x\}', r\_\{2, x\}',$ and $r\_\{3, x\}'$ satisfying $$r\_\{1,x\}' + r\_\{2,x\}' + r\_\{3,x\}' = r\_x' \bmod 2 \tag{117}$$

<Step E2>
Next, the partial share information extraction part 402 outputs share information (also referred to as share information of $r\_\{1, x\}'$ or partial share information), in which values other than the portion related to $r\_\{1, x\}'$ are assumed to be zero, from the share information of r_x'.

<Step E3>
Next, the partial share information extraction part 402 outputs share information (also referred to as share information of $r\_\{2, x\}'$ or partial share information), in which values other than the portion related to $r\_\{2, x\}'$ are assumed to be zero, from the share information of r_x'.

<Step E4>
Next, the partial share information extraction part 402 outputs share information (also referred to as share information of $r\_\{3, x\}'$ or partial share information), in which values other than the portion related to $r\_\{3, x\}'$ are assumed to be zero, from the share information of r_x'.

<Step E5>
Next, the carry secure computation part 404 receives the share information of $$r\_\{1,x\}', r\_\{2,x\}', \text{ and } r\_\{3,x\}' \tag{118}$$

generated by the partial share information extraction part 302 and share information with respect to a 2-bit carry $$c\_\{x\}, d\_\{x\} \tag{119}$$

from an (x−1)th digit as input, performs secure computation that computes share information of a 2-bit carry $$c\_\{x+1\}, d\_\{x+1\} \tag{120}$$

generated from the five sets of inputs, and supplies the results to the incorporating secure computation part 405.

The present example embodiment is configured to perform bit-combining processing. In the fifth embodiment, the processing time can be reduced as compared with the case where the processing is executed sequentially.

Figure 11:
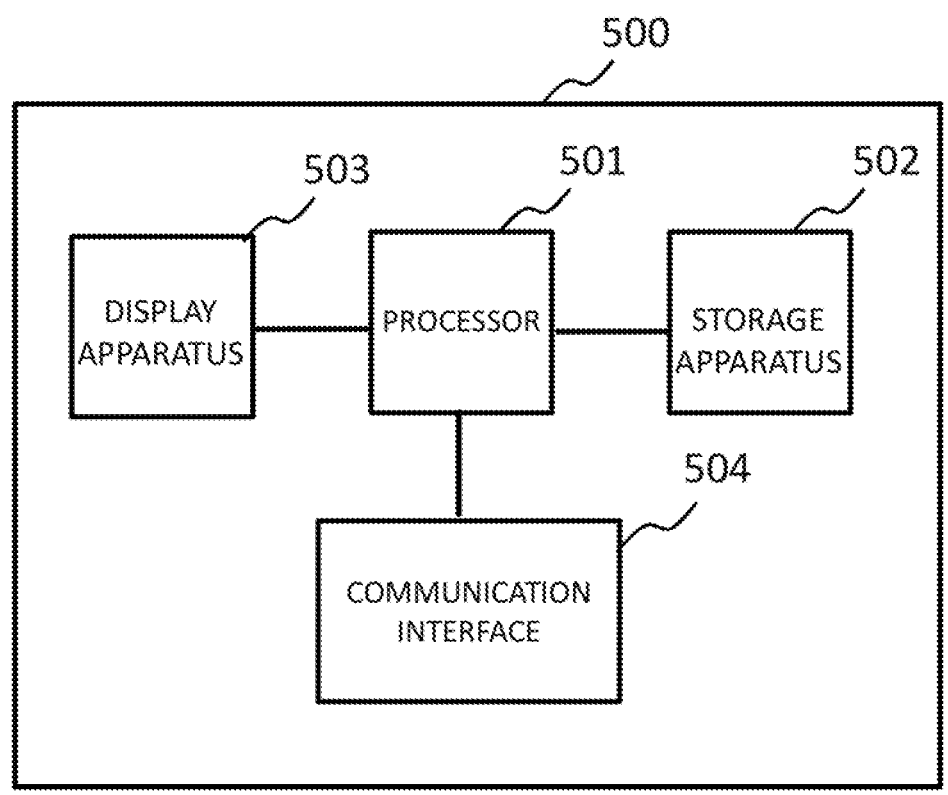
FIG. 11 is a drawing schematically illustrating a sixth example embodiment of the present invention.

FIG. 11 is a drawing illustrating a configuration in which any of the apparatuses 10, 10A, 10B, 20, and 20A according to the first to fifth example embodiments described above is implemented with a computer apparatus 500. With reference to FIG. 11, the computer apparatus 500 includes a processor 501, a storage apparatus 502, a display apparatus 503, and a communication interface 504. The storage apparatus 502 is constituted by any of a hard disk drive (HDD), semiconductor memory (for instance solid-state drive (SSD), dynamic random-access memory (DRAM), static random-access memory (SRAM), read-only memory (ROM), and electrically erasable programmable read-only memory (EEPROM)), compact disc (CD), and digital versatile disc (DVD) or by a combination of a plurality thereof, and stores a program executed by the processor 501. The communication interface 504 communicates with another apparatus by transmitting/receiving share information. The processor 501 realizes the functions of each of the apparatuses 10, 10A, 10B, 20, and 20A according to the first to fifth example embodiments by executing the program stored in the storage apparatus 502. The storage apparatus 502 may be configured to include the share value storage apparatus 100 and the decomposed share value storage apparatus 200.

By using the present example embodiments described above, it becomes possible to convert values shared using (2, 3) threshold type RSS into values in which each bit is shared using (2, 3) threshold type RSS. Further, the reverse process can be executed efficiently. With this process enabled, it becomes possible to efficiently execute complex processing that combines secure computation on values and secure computation on bits.

Further, each disclosure of Non-Patent Literatures 1 to 3 cited above is incorporated herein in its entirety by reference thereto. It is to be noted that it is possible to modify or adjust the example embodiments or examples within the whole disclosure of the present invention (including the Claims) and based on the basic technical concept thereof. Further, it is possible to variously combine or select a wide variety of the disclosed elements (including the individual elements of the individual claims, the individual elements of the individual examples and the individual elements of the individual figures) within the scope of the Claims of the present invention. That is, it is self-explanatory that the present invention includes any types of variations and modifications to be done by a skilled person according to the whole disclosure including the Claims, and the technical concept of the present invention.

For instance, the aspects (modes), the example embodiments, and the examples above can be described as (but not limited to) the following Supplementary Notes.

(Supplementary Note 1)

A secure computation apparatus comprising:

a share value storage apparatus that stores share values obtained by using (2, 3) threshold type RSS (Replicated Secret Sharing) modulo the power of 2;

a decomposed share value storage apparatus that stores a sequence of share values obtained by using (2, 3) threshold type RSS with modulo 2; and a bit-decomposition secure computation apparatus, wherein with respect to a value w, the bit-decomposition secure computation apparatus uses r1, r2, and r3 satisfying w=r1+r2+r3 mod $2^n$ (where mod is a modulo operation; ^ is a power operator) as share information of (2, 3) threshold type RSS stored in the share value storage apparatus, and includes:

an addition sharing part that sums two values out of the share information by modulo $2^n$ arithmetic and distributes the sum using (2, 3) threshold type RSS; and a full adder secure computation part that adds the value generated by the addition sharing part by distributing the sum of the two values to share information of one remaining value other than the two values used by the addition sharing part for each digit by using secure computation of a full adder to store a computation result in the decomposed share value storage apparatus.

(Supplementary Note 2)

The secure computation apparatus according to Supplementary Note 1, wherein the bit-decomposition secure computation apparatus comprises a partial share information extraction part that generates share information of the one value by setting the values to zero except for the one value out of the three values constituting the share information in (2, 3) threshold type RSS, and the full adder secure computation part performs addition processing using secure computation of a full adder on the share information of the sum of the two values generated and distributed by the addition sharing part and the share information of the one value generated by the partial share information extraction part, and stores the value obtained by combining the share information of the computation result for each digit in the decomposed share value storage apparatus.

(Supplementary Note 3)

A secure computation apparatus comprising:

a share value storage apparatus that stores share values obtained by using (2, 3) threshold type RSS (Replicated Secret Sharing) with modulo 2 to the power of n;

a decomposed share value storage apparatus that stores a sequence of share values obtained by using (2, 3) threshold type RSS with modulo 2; and a bit-decomposition secure computation apparatus, wherein with respect to a value w, the bit-decomposition secure computation apparatus uses r1, r2, and r3 satisfying w=r1+r2+r3 mod $2^n$ as share information of (2, 3) threshold type RSS stored in the share value storage apparatus, and includes a full adder secure computation part that performs secure computation of $$r12 = r1 + r2 \bmod 2^n \text{(where mod is a modulo operation; ^ is a power operator) and}$$

$$r123 = r12 + r3 \bmod 2^n$$

for each digit using secure computation of a full adder to store a computation result in the decomposed share value storage apparatus.

(Supplementary Note 4)

The secure computation apparatus according to Supplementary Note 3, wherein the bit-decomposition secure computation apparatus comprises a partial share information extraction part that generates share information obtained by setting the values to zero except for each one for each of the three values constituting the share information in (2, 3) threshold type RSS, and the full adder secure computation part performs secure computation of a full adder sequentially from a lower digit for two values out of the three items of the share information generated by the partial share information extraction part, making the resulting sequence share information of the two values, and stores the value obtained by combining the share information of the computation result for each digit using secure computation of a full adder for the share information of the sum of the two values and the share information of the one value in the decomposed share value storage apparatus.

(Supplementary Note 5)

A secure computation apparatus comprising:

a decomposed share value storage apparatus that stores a sequence of share values obtained by using (2, 3) threshold type RSS (Replicated Secret Sharing) with modulo 2;

a share value storage apparatus that stores share values obtained by using (2, 3) threshold type RSS with modulo 2 to the power of n; and a bit-combining secure computation apparatus, wherein with respect to an x-th bit value w_x, (x=1, ..., n), from a (n-bit) sequence of n items of share information of (2, 3) threshold type RSS stored in the decomposed share value storage apparatus, the bit-combining secure computation apparatus uses r_{1, x}, r_{2, x}, and r_{3, x} satisfying w_x=r_{1, x}+r_{2, x}+r_{3, x} mod 2 and includes
a full adder secure computation part that performs secure computation of $$r12 = r\_\{1,n\} \| \ldots \| r\_\{1,1\} + r\_\{2,n\} \bmod 2^n$$

(where mod is a modulo operation; ^ is a power operator; ∥ is a bit concatenation operator; and r_{1, x}, r_{2, x}, and r_{3, x} are the x-th bits of r1, r2, and r3) and $$r123 = r12 + r\_\{3,n\} \| \ldots \| r\_\{3,1\} \bmod 2^n$$

for each digit by using secure computation of a full adder to store a computation result in the share value storage apparatus.

(Supplementary Note 6)

The secure computation apparatus according to Supplementary Note 5, wherein the bit-combining secure computation apparatus comprises a partial share information extraction part that outputs from the value w_x stored in the decomposed share value storage apparatus share information in which values other than the portion related to r_{1, n}∥ ... ∥r_{1, 1} are assumed to be zero, share information in which values other than the portion related to r_{2, n}∥ ... ∥r_{2, 1} are assumed to be zero, and share information in which values other than the portion related to r_{3, n}∥ ... ∥r_{3, 1} are assumed to be zero as the share information of $$r\_\{1,n\} \| \ldots \| r\_\{1,1\},$$

$$r\_\{2,n\} \| \ldots \| r\_\{2,1\}, \text{ and}$$

$$r\_\{3,n\} \| \ldots \| r\_\{3,1\}, \text{ respectively.}$$

(Supplementary Note 7)
A secure computation apparatus comprising:
 a share value storage apparatus that stores share values obtained by using (2, 3) threshold type RSS with modulo 2 to the power of n;
 a decomposed share value storage apparatus that stores a sequence of share values obtained by using (2, 3) threshold type RSS with modulo 2; and
 a bit-decomposition secure computation apparatus, wherein
 with respect to a n-bit value w, the bit-decomposition secure computation apparatus uses r1, r2, and r3 satisfying $w=r\_1+r\_2+r\_3 \mod 2^n$ as share information of (2, 3) threshold type RSS stored in the share value storage apparatus, and includes:
 a carry secure computation part that performs secure computation on $c\_\{x+1\}$, $d\_\{x+1\}$ as a 2-bit carry when addition of x digits is performed for each bit for $r\_\{1, x\}$, $r\_\{2, x\}$, $r\_\{3, x\}$, $c\_\{x\}$, and $d\_\{x\}$, for $x=1, \ldots, n$, where
  $r\_\{i, x\}$ is the x-th bit of $r\_i$, for $i=1, 2, 3$,
  first-digit carry input $c\_\{1\}$ and $d\_\{1\}$ are 0, and
  x is the number of digits from a lower digit; and
 an incorporating secure computation part that stores share information based on the exclusive OR of $r\_\{1, x\}$, $r\_\{2, x\}$, $r\_\{3, x\}$, $c\_\{x\}$, and $d\_\{x\}$ in the decomposed share value storage apparatus as share information of an x-th-bit bit-decomposed value.
(Supplementary Note 8)
The secure computation apparatus according to Supplementary Note 7, wherein
 the carry secure computation part computes $c\{x+1\}$ by performing secure computation on $[(r\_\{1, x\} \text{ XOR } r\_\{2, x\} \text{ XOR } 1) \text{ AND } (r\_\{1, x\} \text{ XOR } r\_\{3, x\})] \text{ XOR } r\_\{3, x\}$, and
 computes $d\_\{x+1\}$ by performing secure computation on $[(c\_\{x\} \text{ XOR } d\_\{x\} \text{ XOR } 1) \text{ AND } (c\_\{x\} \text{ XOR } z\_\{x\})] \text{ XOR } z\_\{x\}$.
(Supplementary Note 9)
A secure computation apparatus comprising:
 a decomposed share value storage apparatus that stores a sequence of share values obtained by using (2, 3) threshold type RSS with modulo 2;
 a share value storage apparatus that stores share values obtained by using (2, 3) threshold type RSS with modulo 2 to the power of n; and a bit-combining secure computation apparatus, wherein
 with respect to a 1-bit value $w\_x$, the bit-combining secure computation apparatus uses $r\_\{1, x\}$, $r\_\{2, x\}$, and $r\_\{3, x\}$ satisfying $w\_x=r\{1, x\}+r\{2, x\}+r\{3, x\} \mod 2$ as a (n-bit) sequence of n items of share information of (2, 3) threshold type RSS stored in the decomposed share value storage apparatus, and includes:
 a carry secure computation part that performs secure computation on $c\_\{x+1\}$, $d\_\{x+1\}$, which is a 2-bit carry in bitwise addition, for $v\_\{x\}$, and $v\_\{1, x\}$, $v\_\{2, x\}$, $v\_\{3, x\}$, $c\_\{x\}$, and $d\_\{x\}$ where
  $c\_\{1\}$, $d\_\{1\}$ are 0,
  x is the number of digits from a lower digit, for $x=1, \ldots, n$,
  $v\_\{x\}$ is the exclusive OR of $w\_x$, $c\_\{x\}$ and $d\_\{x\}$, and
  $v\_\{1, x\}$, $v\_\{2, x\}$, and $v\_\{3, x\}$ are share information of (2, 3) threshold type RSS constituting share information of $v\_\{x\}$, and
 stores the share information of $v\_\{x\}$ in the share value storage apparatus as share information of an x-th digit.
(Supplementary Note 10)
The secure computation apparatus according to Supplementary Note 9, wherein the carry secure computation part computes $c\_\{x+1\}$ by performing secure computation on $[(v\_\{1, x\} \text{ XOR } v\_\{2, x\} \text{ XOR } 1) \text{ AND } (v\_\{1, x\} \text{ XOR } v\_\{3, x\})] \text{ XOR } v\_\{3, x\}$, and
 computes $d\_\{x+1\}$ by performing secure computation on $[(c\_\{x\} \text{ XOR } d\_\{x\} \text{ XOR } 1) \text{ AND } (c\_\{x\} \text{ XOR } v\_\{x\})] \text{ XOR } v\_\{x\}$.
(Supplementary Note 11)
The secure computation apparatus according to Supplementary Note 9 or 10, wherein
 the bit-combining secure computation apparatus comprises: an incorporating secure computation part that receives an x-th digit $r\_x$ of share information of r in (2, 3) threshold type RSS read from the decomposed share value storage apparatus and share information of a 2-bit carry with respect to share information of the x-th digit supplied by the carry secure computation part as input, performs secure computation that computes the exclusive OR of these three values to store a computation result $r\_x'$ in the share value storage apparatus as share information of the x-th digit; and
 a partial share information extraction part that outputs share information in which values other than the portion related to $r\_\{i, x\}'$ are assumed to be 0, for $i=1, 2, 3$ from the share information of $r\_x'$, and
 the carry secure computation part receives three sets of x-th digits of the share information of (2, 3) threshold type RSS generated by the partial share information extraction part and share information with respect to a 2-bit carry from an $(x-1)$-th digit as input, performs secure computation that computes a 2-bit carry generated from five sets of inputs, and supplies the result to the incorporating secure computation part.
(Supplementary Note 12)
A secure computation system comprising three sets of the secure computation apparatuses according to any one of Supplementary Note 1 to 11.
(Supplementary Note 13)
A secure computation method having three sets of secure computation apparatuses constitute a secure computation system, each of the secure computation apparatus comprising:
 a share value storage apparatus that stores share values obtained by using (2, 3) threshold type RSS (Replicated Secret Sharing) modulo the power of 2; and
 a decomposed share value storage apparatus that stores a sequence of share values obtained by using (2, 3) threshold type RSS with modulo 2, wherein
 with respect to a value w, the secure computation apparatus uses r1, r2, and r3 satisfying $w=r1+r2+r3 \mod 2^n$ (where mod is a modulo operation; ^ is a power operator) as share information of (2, 3) threshold type RSS stored in the share value storage apparatus, sums two values out of the share information by modulo $2^n$ arithmetic, distributes the sum using (2, 3) threshold type RSS, adds the value generated by distributing the sum of the two values out of the share information to share information of one remaining value other than the two values for each digit by using secure computation of a full adder, and stores a computation results in the decomposed share value storage apparatus as bit-decomposed share values.
(Supplementary Note 14)
The secure computation method according to Supplementary Note 13, wherein
 the secure computation apparatus generates share information of the one value by setting the values to zero except for the one value out of the three values constituting the share information in (2, 3) threshold type RSS, performs addition processing using secure computation of a full adder on the share information of the sum of the two values and the generated share information of the one value, and stores the value obtained by combining the share information of the computation result for each digit in the decomposed share value storage apparatus.

(Supplementary Note 15)
A secure computation method having three sets of secure computation apparatuses constitute a secure computation system, each of the secure computation apparatus comprising:
  a share value storage apparatus that stores share values obtained by using (2, 3) threshold type RSS (Replicated Secret Sharing) modulo the power of 2; and
  a decomposed share value storage apparatus that stores a sequence of share values obtained by using (2, 3) threshold type RSS with modulo 2, wherein
  with respect to a value w, the secure computation apparatus uses r1, r2, and r3 satisfying w=r1+r2+r3 mod $2^n$ as share information of (2, 3) threshold type RSS stored in the share value storage apparatus, performs secure computation of $$r12 = r1 + r2 \bmod 2^n \text{(where mod is a modulo operation; }\char`\^\text{ is a power operator) and}$$

$$r123 = r12 + r3 \bmod 2^n$$

for each digit using secure computation of a full adder, and stores a computation result in the decomposed share value storage apparatus as bit-decomposed share values.

(Supplementary Note 16)
The secure computation method according to Supplementary Note 15, wherein
  the secure computation apparatus generates share information obtained by setting the values to zero except for each one for each of the three values constituting the share information in (2, 3) threshold type RSS, performs secure computation of a full adder sequentially from a lower digit for two values out of the three items of the generated share information, making the resulting sequence share information of the two values, and stores the value obtained by combining the share information of the computation result for each digit using secure computation of a full adder for the share information of the sum of the two values and the share information of the one value in the decomposed share value storage apparatus.

(Supplementary Note 17)
The secure computation method according to Supplementary Note 16, wherein
  with respect to an x-th bit value $w\_x$, ($x=1, \ldots, n$), from a (n-bit) sequence of n items of share information of (2, 3) threshold type RSS stored in the decomposed share value storage apparatus, the secure computation apparatus uses $r\_\{1, x\}$, $r\_\{2, x\}$, and $r\_\{3, x\}$ satisfying $w\_x = r\_\{1, x\} + r\_\{2, x\} + r\_\{3, x\} \bmod 2$, performs secure computation of $$r12 = r\_\{1,n\} \| \ldots \| r\_\{1,1\} + r\_\{2,n\} \| \ldots \| r\_\{2,1\} \bmod 2n$$

(where mod is a modulo operation; ^ is a power operator; $\|$ is a bit concatenation operator; and $r\_\{1, x\}$, $r\_\{2, x\}$, and $r\_\{3, x\}$ are the x-th bits of r1, r2, and r3) and $$r123 = r12 + r\_\{3,n\} \| \ldots \| r\_\{3,1\} \bmod 2^n$$

for each digit by using secure computation of a full adder to store a computation result in the share value storage apparatus.

(Supplementary Note 18)
The secure computation method according to Supplementary Note 17, wherein
  the secure computation apparatus comprises a partial share information extraction part that outputs from the value $w\_x$ stored in the decomposed share value storage apparatus
    share information in which values other than the portion related to $r\_\{1, n\} \| \ldots \| r\_\{1, 1\}$ are assumed to be zero,
    share information in which values other than the portion related to $r\_\{2, n\} \| \ldots \| r\_\{2, 1\}$ are assumed to be zero, and
    share information in which values other than the portion related to $r\_\{3, n\} \| \ldots \| r\_\{3, 1\}$ are assumed to be zero
  as the share information of $$r\_\{1,n\} \| \ldots \| r\_\{1,1\},$$

$$r\_\{2,n\} \| \ldots \| r\_\{2,1\}, \text{ and}$$

$$r\_\{3,n\} \| \ldots \| r\_\{3,1\}, \text{respectively.}$$

(Supplementary Note 19)
A secure computation method having three sets of secure computation apparatuses constitute a secure computation system, each of the secure computation apparatus comprising:
  a share value storage apparatus that stores share values obtained by using (2, 3) threshold type RSS with modulo 2 to the power of n; and
  a decomposed share value storage apparatus that stores a sequence of share values obtained by using (2, 3) threshold type RSS with modulo 2, wherein
  with respect to a n-bit value w, the secure computation apparatus uses r1, r2, and r3 satisfying $w = r\_1 + r\_2 + r\_3 \bmod 2^n$ as share information of (2, 3) threshold type RSS stored in the share value storage apparatus, performs secure computation on $c\_\{x+1\}$, $d\_\{x+1\}$ as a 2-bit carry when addition of x digits is performed for each bit for $r\_\{1, x\}$, $r\_\{2, x\}$, $r\_\{3, x\}$, $c\_\{x\}$, and $d\_\{x\}$, for $x=1, \ldots, n$, where $r\_\{i, x\}$ is the x-th bit of $r\_i$, for $i=1, 2, 3$,
    first-digit carry input $c\_\{1\}$ and $d\_\{1\}$ are 0, and
    x is the number of digits from a lower digit, and
  stores share information based on the exclusive OR of $r\_\{1, x\}$, $r\_\{2, x\}$, $r\_\{3, x\}$, $c\_\{x\}$, and $d\_\{x\}$ in the decomposed share value storage apparatus as share information of an x-th-bit bit-decomposed value.

(Supplementary Note 20)
The secure computation method according to Supplementary Note 19, wherein
  the secure computation apparatus computes $c\_\{x+1\}$ by performing secure computation on $[(r\_\{1, x\} \text{ XOR } r\_\{2, x\} \text{ XOR } 1) \text{ AND } (r\_\{1, x\} \text{ XOR } r\_\{3, x\})] \text{ XOR } r\_\{3, x\}$, and
  computes $d\_\{x+1\}$ by performing secure computation on $[(c\_\{x\} \text{ XOR } d\_\{x\} \text{ XOR } 1) \text{ AND } (c\_\{x\} \text{ XOR } z\_\{x\})] \text{ XOR } z\_\{x\}$.

(Supplementary Note 21)
A secure computation method having three sets of secure computation apparatuses constitute a secure computation system, each of the secure computation apparatus comprising:
  a decomposed share value storage apparatus that stores a sequence of share values obtained by using (2, 3) threshold type RSS with modulo 2; and
  a share value storage apparatus that stores share values obtained by using (2, 3) threshold type RSS with modulo 2 to the power of n, wherein
  with respect to a 1-bit value $w\_x$, the secure computation apparatus uses $r\_\{1, x\}$, $r\_\{2, x\}$, and $r\_\{3, x\}$ satisfying $w\_x = r\{1, x\} + r\{2, x\} + r\{3, x\} \bmod 2$ as a sequence of n items of share information of (2, 3) threshold type RSS stored in the decomposed share value storage apparatus, performs secure computation on $c_{x+1}$, $d_{x+1}$, which is a 2-bit carry in bitwise addition, for $v_{x}$, and $v_{1, x}$, $v_{2, x}$, $v_{3, x}$, $c_{x}$, and $d_{x}$ where $c_{1}$, $d_{1}$ are 0, x is the number of digits from a lower digit, for x=1, . . . , n, $v_{x}$ is the exclusive OR of $w\_x$, $c_{x}$ and $d_{x}$, and $v_{1, x}$, $v_{2, x}$, and $v_{3, x}$ are share information of (2, 3) threshold type RSS constituting share information of $v_{x}$, and stores the share information of $v_{x}$ in the share value storage apparatus as share information of an x-th digit.

(Supplementary Note 22)

The secure computation method according to Supplementary Note 21, wherein the secure computation apparatus computes $c_{x+1}$ by performing secure computation on [($v_{1, x}$ XOR $v_{2, x}$ XOR 1) AND ($v_{1, x}$ XOR $v_{3, x}$)] XOR $v_{3, x}$, and computes $d_{x+1}$ by performing secure computation on [($c_{x}$ XOR $d_{x}$ XOR 1) AND ($c_{x}$ XOR $v_{x}$)] XOR $v_{x}$.

(Supplementary Note 23)

The secure computation method according to Supplementary Note 21 or 22, wherein the secure computation apparatus executes:

an incorporating secure computation process of receiving an x-th digit $r\_x$ of share information of r in (2, 3) threshold type RSS read from the decomposed share value storage apparatus and share information of a 2-bit carry with respect to share information of the x-th digit supplied by the carry secure computation part as input, performing secure computation that computes the exclusive OR of these three values, and storing the computation result $r\_x'$ in the share value storage apparatus as share information of the x-th digit; and a partial share information extraction process of outputting share information in which values other than the portion related to $r_{i, x}'$ are assumed to be 0, for i=1, 2, 3 from the share information of $r\_x'$, receives three sets of x-th digits of the generated share information of (2, 3) threshold type RSS and share information with respect to a 2-bit carry from an (x−1)-th digit as input, performs secure computation that computes a 2-bit carry generated from five sets of inputs, and supplies the result to the incorporating secure computation process.

(Supplementary Note 24)

A program causing a computer apparatus comprising:

a share value storage apparatus that stores share values obtained by using (2, 3) threshold type RSS (Replicated Secret Sharing) modulo the power of 2; and a decomposed share value storage apparatus that stores a sequence of share values obtained by using (2, 3) threshold type RSS with modulo 2 to execute:

a process (addition sharing process) of, with respect to a value w, using r1, r2, and r3 satisfying w=r1+r2+r3 mod $2^n$ (where mod is a modulo operation; ^ is a power operator) as share information of (2, 3) threshold type RSS stored in the share value storage apparatus, summing two values out of the share information by modulo $2^n$ arithmetic, and distributing the sum using (2, 3) threshold type RSS; and a process (full adder secure computation process) of adding the value generated by the addition sharing process by distributing the sum of the two values to share information of one remaining value other than the two values used by the addition sharing process for each digit by using secure computation of a full adder, and storing the computation results in the decomposed share value storage apparatus as bit-decomposed share values.

(Supplementary Note 25)

The program according to Supplementary Note 24 causing the computer apparatus to execute:

a partial share information extraction process of generating share information of the one value by setting the values to zero except for the one value out of the three values constituting the share information in (2, 3) threshold type RSS; and a process (the full adder secure computation process) of performing addition processing using secure computation of a full adder on the share information of the sum of the two values generated and distributed and the share information of the one value generated in the partial share information extraction process, and storing the value obtained by combining the share information of the computation result for each digit in the decomposed share value storage apparatus.

(Supplementary Note 26)

A program causing a computer apparatus comprising:

a share value storage apparatus that stores share values obtained by using (2, 3) threshold type RSS (Replicated Secret Sharing) with modulo 2 to the power of n; and a decomposed share value storage apparatus that stores a sequence of share values obtained by using (2, 3) threshold type RSS with modulo 2 to execute:

a process (a full adder secure computation process) of, with respect to a value w, using r1, r2, and r3 satisfying w=r1+r2+r3 mod $2^n$ as share information of (2, 3) threshold type RSS stored in the share value storage apparatus, performing secure computation of $$r12=r1+r2 \text{ mod } 2^n$$

(where mod is a modulo operation; ^ is a power operator) and $$r123=r12+r3 \text{ mod } 2^n$$

for each digit using secure computation of a full adder, and storing the computation result in the decomposed share value storage apparatus.

(Supplementary Note 27)

The program according to Supplementary Note 26 causing the computer apparatus to execute:

a partial share information extraction process of generating share information obtained by setting the values to zero except for each one for each of the three values constituting the share information in (2, 3) threshold type RSS; and a process (the full adder secure computation process) of performing secure computation of a full adder sequentially from a lower digit for two values out of the three items of the share information generated in the partial share information extraction process, making the resulting sequence share information of the two values, and storing the value obtained by combining the share information of the computation result for each digit using secure computation of a full adder for the share information of the sum of the two values and the share information of the one value in the decomposed share value storage apparatus.

(Supplementary Note 28)

A program causing a computer apparatus comprising:

a decomposed share value storage apparatus that stores a sequence of share values obtained by using (2, 3) threshold type RSS (Replicated Secret Sharing) with modulo 2; and a share value storage apparatus that stores share values obtained by using (2, 3) threshold type RSS with modulo 2 to the power of n to execute:

a process (full adder secure computation process) of, with respect to an x-th bit value $w\_x$, ($x=1, \ldots, n$), using $r\_\{1, x\}$, $r\_\{2, x\}$, and $r\_\{3, x\}$ satisfying $w\_x=r\_\{1, x\}+r\_\{2, x\}+r\_\{3, x\}$ mod 2 from a (n-bit) sequence of n items of share information of (2, 3) threshold type RSS stored in the decomposed share value storage apparatus, performing secure computation of $r12=r\_\{1, n\}\| \ldots \| r\_\{1, 1\}+r\_\{2, n\}\| \ldots \| r\_\{2, 1\}$ mod $2\char`^n$ (where mod is a modulo operation; ^ is a power operator; $\|$ is a bit concatenation operator; and $r\_\{1, x\}$, $r\_\{2, x\}$, and $r\_\{3, x\}$ are the x-th bits of r1, r2, and r3) and $r123=r12+r\_\{3,n\}\| \ldots \| r\_\{3,1\}$ mod $2\char`^n$ for each digit by using secure computation of a full adder, and storing the computation result in the share value storage apparatus.

(Supplementary Note 29)
The program according to Supplementary Note 28 causing the computer apparatus to execute:
a partial share information extraction process of outputting from the value $w\_x$ stored in the decomposed share value storage apparatus
share information in which values other than the portion related to $r\_\{1, n\}\| \ldots \| r\_\{1, 1\}$ are assumed to be zero,
share information in which values other than the portion related to $r\_\{2, n\}\| \ldots \| r\_\{2, 1\}$ are assumed to be zero, and
share information in which values other than the portion related to $r\_\{3, n\}\| \ldots \| r\_\{3, 1\}$ are assumed to be zero
as the share information of $r\_\{1,n\}\| \ldots \| r\_\{1,1\}$, $r\_\{2,n\}\| \ldots \| r\_\{2,1\}$, and $r\_\{3,n\}\| \ldots \| r\_\{3,1\}$, respectively.

(Supplementary Note 30)
A program causing a computer apparatus comprising:
a share value storage apparatus that stores share values obtained by using (2, 3) threshold type RSS with modulo 2 to the power of n; and
a decomposed share value storage apparatus that stores a sequence of share values obtained by using (2, 3) threshold type RSS with modulo 2 to execute:
a carry secure computation process of, with respect to a n-bit value w, using r1, r2, and r3 satisfying $w=r\_1+r\_2+r\_3$ mod $2\char`^n$ as share information of (2, 3) threshold type RSS stored in the share value storage apparatus, performing secure computation on $c\_\{x+1\}$, $d\_\{x+1\}$ as a 2-bit carry when addition of x digits is performed for each bit for $r\_\{1, x\}$, $r\_\{2, x\}$, $r\_\{3, x\}$, $c\_\{x\}$, and $d\_\{x\}$, for $x=1, \ldots, n$, where
$r\_\{i, x\}$ is the x-th bit of $r\_i$, for $i=1, 2, 3$,
first-digit carry input $c\_\{1\}$ and $d\_\{1\}$ are 0, and
x is the number of digits from a lower digit; and
an incorporating secure computation process of storing share information based on the exclusive OR of $r\_\{1, x\}$, $r\_\{2, x\}$, $r\_\{3, x\}$, $c\_\{x\}$, and $d\_\{x\}$ in the decomposed share value storage apparatus as share information of an x-th-bit bit-decomposed value.
(Supplementary Note 30)
The program according to Supplementary Note 29, wherein the carry secure computation process computes $c\_\{x+1\}$ by performing secure computation on $[(r\_\{1, x\}$ XOR $r\_\{2, x\}$ XOR 1) AND $(r\_\{1, x\}$ XOR $r\_\{3, x\})]$ XOR $r\_\{3, x\}$, and
computes $d\_\{x+1\}$ by performing secure computation on $[(c\_\{x\}$ XOR $d\_\{x\}$ XOR 1) AND $(c\_\{x\}$ XOR $z\_\{x\})]$ XOR $z\_\{x\}$.

(Supplementary Note 31)
A program causing a computer apparatus comprising:
a decomposed share value storage apparatus that stores a sequence of share values obtained by using (2, 3) threshold type RSS with modulo 2; and
a share value storage apparatus that stores share values obtained by using (2, 3) threshold type RSS with modulo 2 to the power of n to execute:
a carry secure computation process of, with respect to a 1-bit value $w\_x$, using $r\_\{1, x\}$, $r\_\{2, x\}$, and $r\_\{3, x\}$ satisfying $w\_x=r\{1, x\}+r\{2, x\}+r\{3, x\}$ mod 2 as a (n-bit) sequence of n items of share information of (2, 3) threshold type RSS stored in the decomposed share value storage apparatus, performing secure computation on $c\_\{x+1\}$, $d\_\{x+1\}$, which is a 2-bit carry in bitwise addition, for $v\_\{x\}$, and $v\_\{1, x\}$, $v\_\{2, x\}$, $v\_\{3, x\}$, $c\_\{x\}$, and $d\_\{x\}$ where
$c\_\{1\}$, $d\_\{1\}$ are 0,
$v\_\{x\}$ is the exclusive OR of $w\_x$, $c\_\{x\}$ and $d\_\{x\}$ for $x=1, \ldots, n$, and
$v\_\{1, x\}$, $v\_\{2, x\}$, and $v\_\{3, x\}$ are share information of (2, 3) threshold type RSS constituting share information of $v\_\{x\}$, and
storing the share information of $v\_\{x\}$ in the share value storage apparatus as share information of an x-th digit.
(Supplementary Note 32)
The program according to Supplementary Note 31, wherein the carry secure computation process computes $c\_\{x+1\}$ by performing secure computation on $[(v\_\{1, x\}$ XOR $v\_\{2, x\}$ XOR 1) AND $(v\_\{1, x\}$ XOR $v\_\{3, x\})]$ XOR $v\_\{3, x\}$, and
computes $d\_\{x+1\}$ by performing secure computation on $[(c\_\{x\}$ XOR $d\_\{x\}$ XOR 1) AND $(c\_\{x\}$ XOR $v\_\{x\})]$ XOR $v\_\{x\}$.
(Supplementary Note 33)
The program according to Supplementary Note 31 or 32 causing the computer apparatus to execute:
an incorporating secure computation process of receiving an x-th digit $r\_x$ of share information of r in (2, 3) threshold type RSS read from the decomposed share value storage apparatus and share information of a 2-bit carry with respect to share information of the x-th digit supplied by the carry secure computation part as input, performing secure computation that computes the exclusive OR of these three values, and storing the computation result $r\_x'$ in the share value storage apparatus as share information of the x-th digit;
a partial share information extraction process of outputting share information in which values other than the portion related to $r\_\{i, x\}'$ are assumed to be 0, for $i=1, 2, 3$ from the share information of $r\_x'$; and
the carry secure computation process of receiving three sets of x-th digits of the share information of (2, 3) threshold type RSS generated in the partial share information extraction process and share information with respect to a 2-bit carry from an (x−1)-th digit as input, performing secure computation that computes a 2-bit carry generated from five sets of inputs, and supplying the result to the incorporating secure computation part.

What is claimed is:
1. A secure computation apparatus comprising:
a share value storage apparatus that stores share values obtained by using (2, 3) threshold type RSS (Replicated Secret Sharing) with modulo 2 to the power of n;
a decomposed share value storage apparatus that stores a sequence of share values obtained by using (2, 3) threshold type RSS with modulo 2; and a bit-decomposition secure computation apparatus including a first processor and a memory storing program instructions executable by the first processor, wherein the first processor included in the bit-decomposition secure computation apparatus is configured to
  with respect to a value w, use r1, r2, and r3 satisfying w=r1+r2+r3 mod $2^n$ (where mod is a modulo operation; n is an integer of 2 or more, and ^ is a power operator), as share information of (2, 3) threshold type RSS stored in the share value storage apparatus, and execute:
    an addition sharing process that sums two values out of the share information by modulo $2^n$ arithmetic and distributes the sum using (2, 3) threshold type RSS; and
    a full adder secure computation process that adds a share value of the sum of the two values generated by the addition sharing process to share information of one remaining value other than the two values used by the addition sharing process, for each digit, by using secure computation of a full adder to store a computation result in the decomposed share value storage apparatus.

2. The secure computation apparatus according to claim 1, wherein the first processor included in the bit-decomposition secure computation apparatus is configured to execute
  a partial share information extraction process that generates share information of the one value by setting the values to zero except for the one value out of the three values constituting the share information in (2, 3) threshold type RSS, and wherein
    the full adder secure computation process performs addition processing using secure computation of a full adder on the share information of the sum of the two values generated and distributed by the addition sharing part and the share information of the one value generated by the partial share information extraction process, and stores the value obtained by combining the share information of the computation result for each digit in the decomposed share value storage apparatus.

3. A secure computation apparatus comprising:
  a share value storage apparatus that stores share values obtained by using (2, 3) threshold type RSS (Replicated Secret Sharing) with modulo 2 to the power of n;
  a decomposed share value storage apparatus that stores a sequence of share values obtained by using (2, 3) threshold type RSS with modulo 2; and
  a bit-decomposition secure computation apparatus including a first processor and a first memory storing program instructions executable by the first processor, wherein the first processor included in the bit-decomposition secure computation apparatus is configured to
    with respect to a value w, use r1, r2, and r3 satisfying w=r1+r2+r3 mod $2^n$ (where mod is a modulo operation; n is an integer of 2 or more; and ^ is a power operator) as share information of (2, 3) threshold type RSS stored in the share value storage apparatus, and execute
      a full adder secure computation process that performs secure computation of $$r12=r1+r2 \bmod 2^n, \text{ and}$$

$$r123=r12+r3 \bmod 2^n$$

for each digit using secure computation of a full adder to store a computation result in the decomposed share value storage apparatus.

4. The secure computation apparatus according to claim 3, wherein the first processor included in the bit-decomposition secure computation apparatus is configured to execute
  a partial share information extraction process that generates share information obtained by setting the values to zero except for each one for each of the three values constituting the share information in (2, 3) threshold type RSS, and wherein
  the full adder secure computation process performs secure computation of a full adder sequentially from a lower digit for two values out of three items of the share information generated by the partial share information extraction process to set resulting sequences as share information of the two values, and stores a value obtained by combining the share information of the computation result for each digit using secure computation of a full adder for the share information of the sum of the two values and the share information of the one value in the decomposed share value storage apparatus.

5. The secure computation apparatus according to claim 3, further comprising:
  a bit-combining secure computation apparatus including a second processor and a second memory storing program instructions executable by the second processor, wherein
  the second processor included in the bit-combining secure computation apparatus is configured to
    with respect to an x-th bit value w_x (x=1, . . . , n) where x is the number of digits from a lower digit, out of a sequence (n bit, n is an integer of 2 or more) of n items of share information of (2, 3) threshold type RSS stored in the decomposed share value storage apparatus, use $r\_\{1,x\}, r\_\{2,x\}$, and $r\_\{3,x\}$ satisfying $w\_x=r\_\{1,x\}+r\_\{2,x\}+r\_\{3,x\}$ mod 2, and includes execute
      a full adder secure computation process that performs secure computation of $$r12=r\_\{1,n\}\| \ldots \{1,1\}+r\_\{2,n\}\| \ldots \|r\_\{2,1\} \bmod 2^n$$

(where mod is a modulo operation, ^ is a power operator, $\|$ is a bit concatenation operator, and r_{1, x}, r_{2, x}, and r_{3, x} are the x-th bits of r1, r2, and r3) and $$r123=r12+r\_\{3,n\}\| \ldots \|r\_\{3,1\} \bmod 2^n$$

for each digit by using secure computation of a full adder to store a computation result in the share value storage apparatus.

6. The secure computation apparatus according to claim 5, wherein the second processor included in the bit-combining secure computation apparatus is configured to execute
  a partial share information extraction process that outputs from the value w_x stored in the decomposed share value storage apparatus
    share information in which values other than portion related to r_{1, n}$\|$ . . . $|$r_{1, 1} are assumed to be zero,
    share information in which values other than portion related to r_{2, n}$\|$ . . . $|$r_{2, 1} are assumed to be zero, and
    share information in which values other than portion related to r_{3, n}$\|$ . . . $|$r_{3, 1} are assumed to be zero, as the share information of $r\_\{1,n\} \| \ldots \| r\_\{1,1\}$, $r\_\{2,n\} \| \ldots \| r\_\{2,1\}$, and $r\_\{3,n\} \| \ldots \| r\_\{3,1\}$, respectively.

7. The secure computation apparatus according to claim 3, wherein the secure computation of adding two values and then adding another value is processed in parallel,
wherein
the first processor included in the bit-decomposition secure computation apparatus is configured to
with respect to a n-bit value w,
use r1, r2, and r3 satisfying $w=r\_1+r\_2+r\_3 \mod 2^n$ (where mod is a modulo operation, n is an integer of 2 or more, and ^ is a power operator) as share information of (2, 3) threshold type RSS stored in the share value storage apparatus, and execute:
a carry secure computation process that performs secure computation on $c\_\{x+1\}$, $d\_\{x+1\}$ as a 2-bit carry in bit-wise addition of x digit of $r\_\{1, x\}$, $r\_\{2, x\}$, $r\_\{3, x\}$, $c\_\{x\}$, and $d\_\{x\}$, for $x=1, \ldots, n$, where $r\_\{i, x\}$ is the x-th bit of $r\_i$, for $i=1, 2, 3$,
first-digit carry input $c\_\{1\}$ and $d\_\{1\}$ are 0, and
x is the number of digits from a lower digit; and
an incorporating secure computation process that stores share information based on exclusive OR of $r\_\{1, x\}$, $r\_\{2, x\}$, $r\_\{3, x\}$, $c\_\{x\}$, and $d\_\{x\}$ in the decomposed share value storage apparatus as share information of an x-th-bit bit-decomposed value.

8. The secure computation apparatus according to claim 7, wherein the first processor is configured to execute the carry secure computation process that computes $c\_\{x+1\}$ by performing secure computation on $[(r\_\{1, x\} \text{ XOR } r\_\{2, x\} \text{ XOR } 1) \text{ AND } (r\_\{1, x\} \text{ XOR } r\_\{3, x\})] \text{ XOR } r\_\{3, x\}$, and computes $d\_\{x+1\}$ by performing secure computation on $[(c\_\{x\} \text{ XOR } d\_\{x\} \text{ XOR } 1) \text{ AND } (c\_\{x\} \text{ XOR } z\_\{x\})] \text{ XOR } z\_\{x\}$.

9. The secure computation apparatus according to claim 7, further comprising:
a bit-combining secure computation apparatus including a second processor and a second memory storing program instructions executable by the second processor,
wherein
the second processor included in the bit-combining secure computation apparatus is configured to
with respect to a 1-bit value $w\_x$,
use $r\_\{1, x\}$, $r\_\{2, x\}$, and $r\_\{3, x\}$ satisfying $w\_x=r\{1, x\}+r\{2, x\}+r\{3, x\} \mod 2$, as a sequence of n items of share information of (2, 3) threshold type RSS stored in the decomposed share value storage apparatus, and execute
a carry secure computation process that performs secure computation on $c\_\{x+1\}$, $d\_\{x+1\}$, which is a 2-bit carry in bitwise addition, for $v\_\{x\}$, and $v\_\{1, x\}$, $v\_\{2, x\}$, $v\_\{3, x\}$, $c\_\{x\}$, and $d\_\{x\}$ where $c\_\{1\}$, $d\_\{1\}$ are 0,
x is the number of digits from a lower digit, for $x=1, \ldots, n$,
$v\_\{x\}$ is an exclusive OR of $w\_x$, $c\_\{x\}$ and $d\_\{x\}$, and $v\_\{1, x\}$, $v\_\{2, x\}$, and $v\_\{3, x\}$ are share information of (2, 3) threshold type RSS constituting share information of $v\_\{x\}$, and
stores the share information of $v\_\{x\}$ in the share value storage apparatus as share information of an x-th digit.

10. The secure computation apparatus according to claim 9, wherein the second processor is configured to execute the carry secure computation process that computes $c\_\{x+1\}$ by performing secure computation on $[(v\_\{1, x\} \text{ XOR } v\_\{2, x\} \text{ XOR } 1) \text{ AND } (v\_\{1, x\} \text{ XOR } v\_\{3, x\})] \text{ XOR } v\_\{3, x\}$, and computes $d\_\{x+1\}$ by performing secure computation on $[(c\_\{x\} \text{ XOR } d\_\{x\} \text{ XOR } 1) \text{ AND } (c\_\{x\} \text{ XOR } v\_\{x\})] \text{ XOR } v\_\{x\}$.

11. The secure computation apparatus according to claim 9, wherein the second processor is configured to execute:
an incorporating secure computation process that receives an x-th digit ($r\_x$) of share information of r in (2, 3) threshold type RSS read from the decomposed share value storage apparatus and share information of a 2-bit carry with respect to share information of the x-th digit supplied by the carry secure computation process as input, performs secure computation that computes the exclusive OR of these three values to store a computation result $r\_x'$ in the share value storage apparatus as share information of the x-th digit; and
a partial share information extraction process that outputs share information in which values other than portion related to $r\_\{i, x\}'$ are assumed to be 0, for $i=1, 2, 3$ from the share information of $r\_x'$, and wherein
the carry secure computation process receives three sets of x-th digits of the share information of (2, 3) threshold type RSS generated by the partial share information extraction process and share information with respect to a 2-bit carry from an $(x-1)$-th digit as input, performs secure computation that computes a 2-bit carry generated from five sets of inputs, and supplies the result to the incorporating secure computation process.

12. A secure computation method for three sets of secure computation apparatuses constituting a secure computation system, each of the secure computation apparatus comprising:
a share value storage apparatus that stores share values obtained by using (2, 3) threshold type RSS (Replicated Secret Sharing) modulo the power of 2; and
a decomposed share value storage apparatus that stores a sequence of share values obtained by using (2, 3) threshold type RSS with modulo 2, wherein the method comprises:
the secure computation apparatus, with respect to a value w,
using r1, r2, and r3 satisfying $w=r1+r2+r3 \mod 2^n$ (where mod is a modulo operation, ^ is a power operator) as share information of (2, 3) threshold type RSS stored in the share value storage apparatus;
summing two values out of the share information by modulo $2^n$ arithmetic;
distributing the sum using (2, 3) threshold type RSS; and
adding the share value of the sum of the two values and share information of one remaining value other than the two values for each digit by using secure computation of a full adder to store a computation results in the decomposed share value storage apparatus as bit-decomposed share values.

13. The secure computation method according to claim 12, comprising:
the secure computation apparatus, with respect to a n-bit value w,
using r1, r2, and r3 satisfying $w=r\_1+r\_2+r\_3 \mod 2^n$ as share information of (2, 3) threshold type RSS stored in the share value storage apparatus, performing secure computation on $c_{\{x+1\}}$, $d_{\{x+1\}}$ as a 2-bit carry in addition of x digit for each bit, for $r_{\{1, x\}}$, $r_{\{2, x\}}$, $r_{\{3, x\}}$, $c_{\{x\}}$, and $d_{\{x\}}$, for $x=1, \ldots, n$, where $r_{\{i, x\}}$ is the i-th bit of $r_x$ for $i=1, 2, 3$, first-digit carry input $c_{\{1\}}$, $d_{\{1\}}$ is assumed to 0, and x is the number of digits from a lower digit; and storing share information based on the exclusive OR of $r_{\{1, x\}}$, $r_{\{2, x\}}$, $r_{\{3, x\}}$, $c_{\{x\}}$, and $d_{\{x\}}$ in the decomposed share value storage apparatus as share information of an x-th-bit bit-decomposed value.

14. The secure computation method according to claim 12, comprising:

the secure computation apparatus, with respect to a 1-bit value $w_x$, using $r_{\{1, x\}}$, $r_{\{2, x\}}$, and $r_{\{3, x\}}$ satisfying $w_x = r\{1, x\} + r\{2, x\} + r\{3, x\}$ mod 2 as a (n-bit) sequence of n items of share information of (2, 3) threshold type RSS stored in the decomposed share value storage apparatus, performing secure computation on $c_{\{x+1\}}$, $d_{\{x+1\}}$, which is a 2-bit carry in bitwise addition, for $v_{\{x\}}$, and $v_{\{1, x\}}$, $v_{\{2, x\}}$, $v_{\{3, x\}}$, $c_{\{x\}}$, and $d_{\{x\}}$ where $c_{\{1\}}$, $d_{\{1\}}$ are 0, x is the number of digits from a lower digit, for $x=1, \ldots, n$, $v_{\{x\}}$ is an exclusive OR of $w_x$, $c_{\{x\}}$ and $d_{\{x\}}$, and $v_{\{1, x\}}$, $v_{\{2, x\}}$, and $v_{\{3, x\}}$ are share information of (2, 3) threshold type RSS constituting share information of $v_{\{x\}}$; and storing the share information of $v_{\{x\}}$ in the share value storage apparatus as share information of an x-th digit.

15. A non-transitory computer readable medium storing a program causing a computer apparatus comprising:

a share value storage apparatus that stores share values obtained by using (2, 3) threshold type RSS (Replicated Secret Sharing) modulo the power of 2; and a decomposed share value storage apparatus that stores a sequence of share values obtained by using (2, 3) threshold type RSS with modulo 2 to execute processing comprising:

with respect to a value w, using r1, r2, and r3 satisfying $w = r1+r2+r3 \mod 2^n$ (where mod is a modulo operation; ^ is a power operator) as share information of (2, 3) threshold type RSS stored in the share value storage apparatus, summing two values out of the share information by modulo $2^n$ arithmetic;

distributing the sum using (2, 3) threshold type RSS; and adding the share value of the sum of the two values and share information of one remaining value other than the two values for each digit by using secure computation of a full adder; and storing the computation results in the decomposed share value storage apparatus as bit-decomposed share values.

16. The non-transitory computer readable medium according to claim 15, storing the program causing the computer apparatus to execute processing comprising:

with respect to a n-bit value w, using r1, r2, and r3 satisfying $w = r\_1 + r\_2 + r\_3 \mod 2^n$ as share information of (2, 3) threshold type RSS stored in the share value storage apparatus, performing secure computation on $c_{\{x+1\}}$, $d_{\{x+1\}}$ as a 2-bit carry in addition of x digit for each bit for $r_{\{1, x\}}$, $r_{\{2, x\}}$, $r_{\{3, x\}}$, $c_{\{x\}}$, and $d_{\{x\}}$, for $x=1, \ldots, n$, where $r_{\{i, x\}}$ is the x-th bit of $r_i$, for $i=1, 2, 3$, first-digit carry input $c_{\{1\}}$ and $d_{\{1\}}$ are 0, and x is the number of digits from a lower digit; and storing share information based on the exclusive OR of $r_{\{1, x\}}$, $r_{\{2, x\}}$, $r_{\{3, x\}}$, $c_{\{x\}}$, and $d_{\{x\}}$ in the decomposed share value storage apparatus as share information of an x-th-bit bit-decomposed value.

17. The non-transitory computer readable medium according to claim 15, storing the program causing the computer apparatus to execute processing comprising:

with respect to a 1-bit value $w_x$, using $r_{\{1, x\}}$, $r_{\{2, x\}}$, and $r_{\{3, x\}}$ satisfying $w_x = r\{1, x\} + r\{2, x\} + r\{3, x\}$ mod 2 as a (n-bit) sequence of n items of share information of (2, 3) threshold type RSS stored in the decomposed share value storage apparatus, performing secure computation on $c_{\{x+1\}}$, $d_{\{x+1\}}$, which is a 2-bit carry in bitwise addition, for $v_{\{x\}}$, and $v_{\{1, x\}}$, $v_{\{2, x\}}$, $v_{\{3, x\}}$, $c_{\{x\}}$, and $d_{\{x\}}$ where $c_{\{1\}}$, $d_{\{1\}}$ are 0, x is the number of digits from a lower digit, for $x=1, \ldots, n$, $v_{\{x\}}$ is the exclusive OR of $w_x$, $c_{\{x\}}$ and $d_{\{x\}}$, and $v_{\{1, x\}}$, $v_{\{2, x\}}$, and $v_{\{3, x\}}$ are share information of (2, 3) threshold type RSS constituting share information of $v_{\{x\}}$; and storing the share information of $v_{\{x\}}$ in the share value storage apparatus as share information of an x-th digit.

* * * * *